US012190693B2

(12) United States Patent
Mullins

(10) Patent No.: US 12,190,693 B2
(45) Date of Patent: Jan. 7, 2025

(54) VIDEO ANALYTICS SYSTEM FOR IDENTIFYING EVENTS

(71) Applicant: RAPTOR VISION, LLC, Tustin, CA (US)

(72) Inventor: Scott Charles Mullins, Tustin, CA (US)

(73) Assignee: RAPTOR VISION, LLC, Tustin, CA (US)

( * ) Notice: Subject to any disclaimer, the term of this patent is extended or adjusted under 35 U.S.C. 154(b) by 0 days.

(21) Appl. No.: 18/309,679

(22) Filed: Apr. 28, 2023

(65) Prior Publication Data

US 2024/0071190 A1 Feb. 29, 2024

Related U.S. Application Data

(63) Continuation of application No. 17/739,011, filed on May 6, 2022, now Pat. No. 11,682,277, which is a (Continued)

(51) Int. Cl.
*H04N 11/02* (2006.01)
*G08B 13/19* (2006.01)

(Continued)

(52) U.S. Cl.
CPC ....... *G08B 13/19613* (2013.01); *G08B 13/19* (2013.01); *G08B 13/19615* (2013.01);

(Continued)

(58) Field of Classification Search
CPC ................................................ G08B 13/19613

(Continued)

(56) References Cited

U.S. PATENT DOCUMENTS

| | | | |
|---|---|---|---|
| 5,151,684 | A | 9/1992 | Johnsen |
| 6,476,859 | B1 | 11/2002 | Galloway et al. |

(Continued)

FOREIGN PATENT DOCUMENTS

| | | |
|---|---|---|
| CA | 2 971 586 | 12/2017 |
| CN | 109391757 | 2/2019 |

(Continued)

OTHER PUBLICATIONS

Written Opinion for PCT Application No. PCT/US2018/056934 dated Feb. 8, 2019.

(Continued)

*Primary Examiner* — Leron Beck
(74) *Attorney, Agent, or Firm* — Knobbe, Martens, Olson & Bear, LLP

(57) ABSTRACT

A security system can use video analytics and/or other input parameters to identify a theft event. Optionally, the security system can take remedial action in response. For example, the security system can use video analytics to determine that a person has reached into a shelf multiple times at a rate above a threshold, which can indicate that a thief is quickly removing items from the shelf. The security system can also use video analytics to determine that a person has reached into a shelf via a sweeping action, which can indicate that a thief is gathering and removing a large quantity of items from the shelf in one motion. In response, the security system can alert security personnel, cause a speaker to output an audible message in the target area, flag portions of the video relating to the theft event, activate or ready other sensors or systems, and/or the like.

16 Claims, 22 Drawing Sheets

Related U.S. Application Data continuation of application No. 16/698,806, filed on Nov. 27, 2019, now Pat. No. 11,328,566, which is a continuation of application No. 16/213,487, filed on Dec. 7, 2018, now Pat. No. 10,497,231, which is a continuation of application No. 16/056,303, filed on Aug. 6, 2018, now Pat. No. 10,186,124, which is a continuation-in-part of application No. 15/871,897, filed on Jan. 15, 2018, now Pat. No. 10,043,360.

(60) Provisional application No. 62/612,259, filed on Dec. 29, 2017, provisional application No. 62/577,650, filed on Oct. 26, 2017.

(51) Int. Cl.
*G08B 13/196* (2006.01)
*G08B 25/14* (2006.01)
*G08B 29/18* (2006.01)
*H04R 27/00* (2006.01)
*G08B 15/00* (2006.01)

(52) U.S. Cl.
CPC ... *G08B 13/19652* (2013.01); *G08B 13/1968* (2013.01); *G08B 13/19682* (2013.01); *G08B 25/14* (2013.01); *G08B 29/188* (2013.01); *H04R 27/00* (2013.01); *G08B 13/19695* (2013.01); *G08B 15/00* (2013.01); *H04R 2227/003* (2013.01)

(58) Field of Classification Search
USPC ........................................................ 348/159
See application file for complete search history.

(56) References Cited

U.S. PATENT DOCUMENTS

| | | | |
|---|---|---|---|
| 6,528,788 | B1 | 3/2003 | Galloway |
| 6,628,835 | B1 | 9/2003 | Brill et al. |
| 6,653,939 | B2 | 11/2003 | Galloway |
| 6,693,279 | B2 | 2/2004 | Porter et al. |
| 6,710,345 | B2 | 3/2004 | Carter et al. |
| 6,727,938 | B1 | 4/2004 | Randall |
| 6,744,049 | B2 | 6/2004 | Galloway |
| 6,809,595 | B2 | 10/2004 | Porter et al. |
| 6,818,893 | B2 | 11/2004 | Carter |
| 6,992,291 | B2 | 1/2006 | Porter et al. |
| 6,992,292 | B2 | 1/2006 | Cross |
| 7,008,063 | B2 | 3/2006 | Porter et al. |
| 7,263,500 | B2 | 8/2007 | Deal |
| D550,198 | S | 9/2007 | Deal |
| 7,355,626 | B2 | 4/2008 | Porter et al. |
| D583,355 | S | 12/2008 | Wente |
| 7,778,855 | B2 | 8/2010 | Holliday |
| 7,796,780 | B2 | 9/2010 | Lipton et al. |
| 7,801,330 | B2 | 9/2010 | Zhang et al. |
| 7,957,565 | B1 | 6/2011 | Sharma et al. |
| 8,325,036 | B1 | 12/2012 | Fuhr et al. |
| 8,438,175 | B2 | 5/2013 | Papke et al. |
| 8,489,065 | B2 | 7/2013 | Green et al. |
| 8,564,661 | B2 | 10/2013 | Lipton et al. |
| 8,629,772 | B2 | 1/2014 | Valiulis et al. |
| 8,731,241 | B2 | 5/2014 | Johnson et al. |
| 8,803,687 | B2 | 8/2014 | Valiulis et al. |
| 8,866,612 | B1 | 10/2014 | Foster |
| 8,884,761 | B2 | 11/2014 | Valiulis |
| 9,000,926 | B2 | 4/2015 | Hollock et al. |
| 9,035,771 | B2 | 5/2015 | Argue et al. |
| 9,196,136 | B2 | 11/2015 | King |
| 9,318,007 | B2 | 4/2016 | Valiulis et al. |
| 9,318,008 | B2 | 4/2016 | Valiulis et al. |
| 9,324,220 | B2 | 4/2016 | Valiulis |
| 9,530,060 | B2 | 12/2016 | Zhang et al. |
| 9,591,267 | B2 | 3/2017 | Lipton et al. |
| 9,613,518 | B2 | 4/2017 | Dunn et al. |
| 9,672,707 | B2 | 6/2017 | Kerzner |
| 9,674,458 | B2 | 6/2017 | Teich et al. |
| 9,697,709 | B2 | 7/2017 | King et al. |
| 9,740,937 | B2 | 8/2017 | Zhang et al. |
| 9,787,862 | B1 | 10/2017 | Newman et al. |
| 9,805,582 | B2 | 10/2017 | Jedwab |
| 9,922,483 | B2 | 3/2018 | Forshaw |
| 9,965,936 | B1 | 5/2018 | Epps |
| 10,043,360 | B1 | 8/2018 | Mullins |
| 10,055,850 | B2 | 8/2018 | Piekniewski et al. |
| 10,186,124 | B1 | 1/2019 | Mullins |
| 10,373,322 | B1 | 8/2019 | Buibas et al. |
| 10,445,944 | B2 | 10/2019 | Galera et al. |
| 10,497,231 | B2 | 12/2019 | Mullins |
| 10,510,227 | B2 | 12/2019 | King et al. |
| 11,216,827 | B2 | 1/2022 | Budano et al. |
| 11,328,566 | B2 | 5/2022 | Mullins |
| 11,682,277 | B2 | 6/2023 | Mullins |
| 11,961,319 | B2 | 4/2024 | Mullins |
| 2002/0095490 | A1 | 7/2002 | Baker et al. |
| 2003/0107650 | A1 | 6/2003 | Colmenarez et al. |
| 2003/0136910 | A1 | 7/2003 | Carter |
| 2004/0105570 | A1 | 6/2004 | Venetianer et al. |
| 2004/0190767 | A1 | 9/2004 | Tedesco et al. |
| 2005/0078853 | A1 | 4/2005 | Buehler et al. |
| 2006/0053342 | A1 | 3/2006 | Bazakos et al. |
| 2006/0078047 | A1 | 4/2006 | Shu et al. |
| 2006/0262958 | A1 | 11/2006 | Yin et al. |
| 2007/0051872 | A1 | 3/2007 | Goldberg et al. |
| 2007/0273514 | A1 | 11/2007 | Winand et al. |
| 2008/0018738 | A1 | 1/2008 | Lipton et al. |
| 2008/0074496 | A1 | 3/2008 | Venetianer et al. |
| 2008/0317286 | A1 | 12/2008 | Thorpe et al. |
| 2009/0140850 | A1 | 6/2009 | Kangas et al. |
| 2009/0179988 | A1 | 7/2009 | Reibel et al. |
| 2009/0268028 | A1 | 10/2009 | Ikumi et al. |
| 2010/0149330 | A1 | 6/2010 | Salgar et al. |
| 2010/0195865 | A1 | 8/2010 | Luff |
| 2011/0228984 | A1 | 9/2011 | Papke et al. |
| 2011/0295583 | A1 | 12/2011 | Hollock et al. |
| 2012/0038456 | A1 | 2/2012 | Pikkarainen et al. |
| 2012/0150586 | A1 | 6/2012 | Harper et al. |
| 2012/0176496 | A1 | 7/2012 | Carbonell et al. |
| 2013/0182114 | A1 | 7/2013 | Zhang et al. |
| 2013/0246182 | A1 | 9/2013 | Bradley et al. |
| 2013/0305261 | A1 | 11/2013 | Snell et al. |
| 2014/0104034 | A1 | 4/2014 | Ambrefe, Jr. et al. |
| 2014/0161315 | A1 | 6/2014 | Ostrovsky-Berman et al. |
| 2014/0362223 | A1 | 12/2014 | LaCroix et al. |
| 2015/0294183 | A1 | 10/2015 | Watanabe et al. |
| 2015/0312602 | A1 | 10/2015 | Myers et al. |
| 2016/0006991 | A1 | 1/2016 | Sablak et al. |
| 2016/0019698 | A1 | 1/2016 | Kalva et al. |
| 2016/0043905 | A1 | 2/2016 | Fiedler |
| 2016/0133021 | A1 | 5/2016 | Gouda et al. |
| 2016/0148218 | A1 | 5/2016 | Koch et al. |
| 2016/0342929 | A1 | 11/2016 | Tanaka et al. |
| 2017/0004694 | A1 | 1/2017 | Dodson |
| 2017/0024986 | A1 | 1/2017 | Austin |
| 2017/0053191 | A1 | 2/2017 | Koyama |
| 2017/0234067 | A1 | 8/2017 | Fasi et al. |
| 2017/0256148 | A1 | 9/2017 | King et al. |
| 2017/0308939 | A1 | 10/2017 | Kirshnan et al. |
| 2018/0192057 | A1 | 7/2018 | Ardo et al. |
| 2018/0219887 | A1 | 8/2018 | Luo et al. |
| 2018/0247132 | A1 | 8/2018 | Liu et al. |
| 2018/0350217 | A1 | 12/2018 | Kerzner |
| 2019/0012547 | A1 | 1/2019 | Togashi et al. |
| 2019/0012607 | A1 | 1/2019 | Holliday et al. |
| 2019/0088096 | A1 | 3/2019 | King et al. |
| 2019/0149725 | A1 | 5/2019 | Adato et al. |
| 2019/0259259 | A1 | 8/2019 | Mullins |
| 2019/0325230 | A1 | 10/2019 | Nadler |
| 2019/0392605 | A1 | 12/2019 | Holliday et al. |
| 2020/0211343 | A1 | 7/2020 | Mullins |
| 2020/0286347 | A1 | 9/2020 | Kernzer |
| 2020/0327315 | A1 | 10/2020 | Mullins |
| 2020/0349820 | A1 | 11/2020 | Speagle et al. |

(56) References Cited

U.S. PATENT DOCUMENTS

| | | | |
|---|---|---|---|
| 2020/0364999 A1 | 11/2020 | Mullins |
| 2022/0262218 A1 | 8/2022 | Mullins |
| 2024/0071191 A1 | 2/2024 | Mullins |

FOREIGN PATENT DOCUMENTS

| | | |
|---|---|---|
| JP | 2002252848 | 9/2002 |
| JP | 2004007089 | 1/2004 |
| JP | 2017-118324 | 6/2017 |
| KR | 10-2015-437120000 | 8/2015 |
| KR | 10-2016-0081736 | 7/2016 |
| RU | 127500 U1 | 4/2013 |
| TW | 201830973 | 8/2018 |
| TW | 201901626 | 1/2019 |
| WO | WO 2017/122258 | 7/2017 |
| WO | WO 2019/083902 | 5/2019 |
| WO | WO 2020/210385 | 10/2020 |
| WO | WO 2022/147455 | 7/2022 |

OTHER PUBLICATIONS

International Search Report for PCT Application No. PCT/US2018/056934 dated Feb. 8, 2019.

Written Opinion for PCT Application No. PCT/US2020/027312 dated Oct. 29, 2020.

International Search Report for PCT Application No. PCT/US2020/027312 dated Oct. 29, 2020.

Transcript of "Perimeter Protection in VideoEdge and victor 5.0 and above," Aug. 22, 2017, video available at: http://learn.tycosecurityproducts.com/video/Perimeter-Protection-in-VideoEdge-and-victor-50-and-above/4112a02c147b83549245bf8a0664f358.

Occupancy Monitoring and Desk Occupancy Sensors, retrieved May 21, 2020 from: https://www.pressac.com/occupancy-monitoring/ https://www.pressac.com/desk-occupancy-sensors/.

Ahmad et al., "An Intelligent Real-Time Occupancy Monitoring System Using Single Overhead Camera." Proceedings of the 2018 Intelligent Systems Conference, IntelliSys 2018, AISC 869, pp. 957-969, Nov. 2018.

Axis Occupancy Estimator, Sep. 4, 2019, https://www.axis.com/en-us/products/axis-occupancy-estimator/.

Axis Store Optimization: Reference Guide, dated Apr. 2018.

Axis Occupany Estimator—Data Sheet. Appears to have a date of 2013.

Axis—Flexible and Reliable Recording Solutions—Edge Storage, appears to have a date of 2017.

Axis announces tightly integrated edge storage for more robust video surveillance systems, dated Sep. 19, 2011.

Anthony, K.S., "This AI Detects Shoplifters Before They Steal, But There's Something Even Creepier About It," Mar. 7, 2019.

Cal Atlantic. "Everything You Need to Know About Intelligent Video Surveillance Systems for Retail," Apr. 10, 2020.

Written Opinion for PCT Application No. PCT/US2021/073163 dated Apr. 20, 2022.

International Search Report for PCT Application No. PCT/US2021/073163 dated Apr. 20, 2022.

System Overview

Raptor-Vision Server Network

FIG. 9

Raptor-Vision Peer-to-Peer Server Network:

Raptor Vision can be a unique and special system driven directly to the needs of Loss Prevention Departments, ORC Professionals, and/or Risk Management/Safety Departments.

It can be an "Integrated Security System" for loss prevention professionals specifically.

In some implementations, Raptor Vision Servers will not be interacting with existing company networks, VPNs, or "the cloud" in anyway.

Therefore, IT approval and testing for Cyber Security Threats will not be required nor requested, in some implementations.

In some implementations, there will be no PCI compliance issues as well since there will be no interaction, surveillance, or monitoring of IDF/MDF/ server rooms, or registers.

In some implementations, this will not be on the cloud because in some cases the cloud may not be a secure location or conduit for secured trans-missions of ORC activitiy or any other serious security solution.

In some implementations, this will not require a "big data" integration of any kind because this may not be sufficiently available nor a proactive method of the deterring crime.

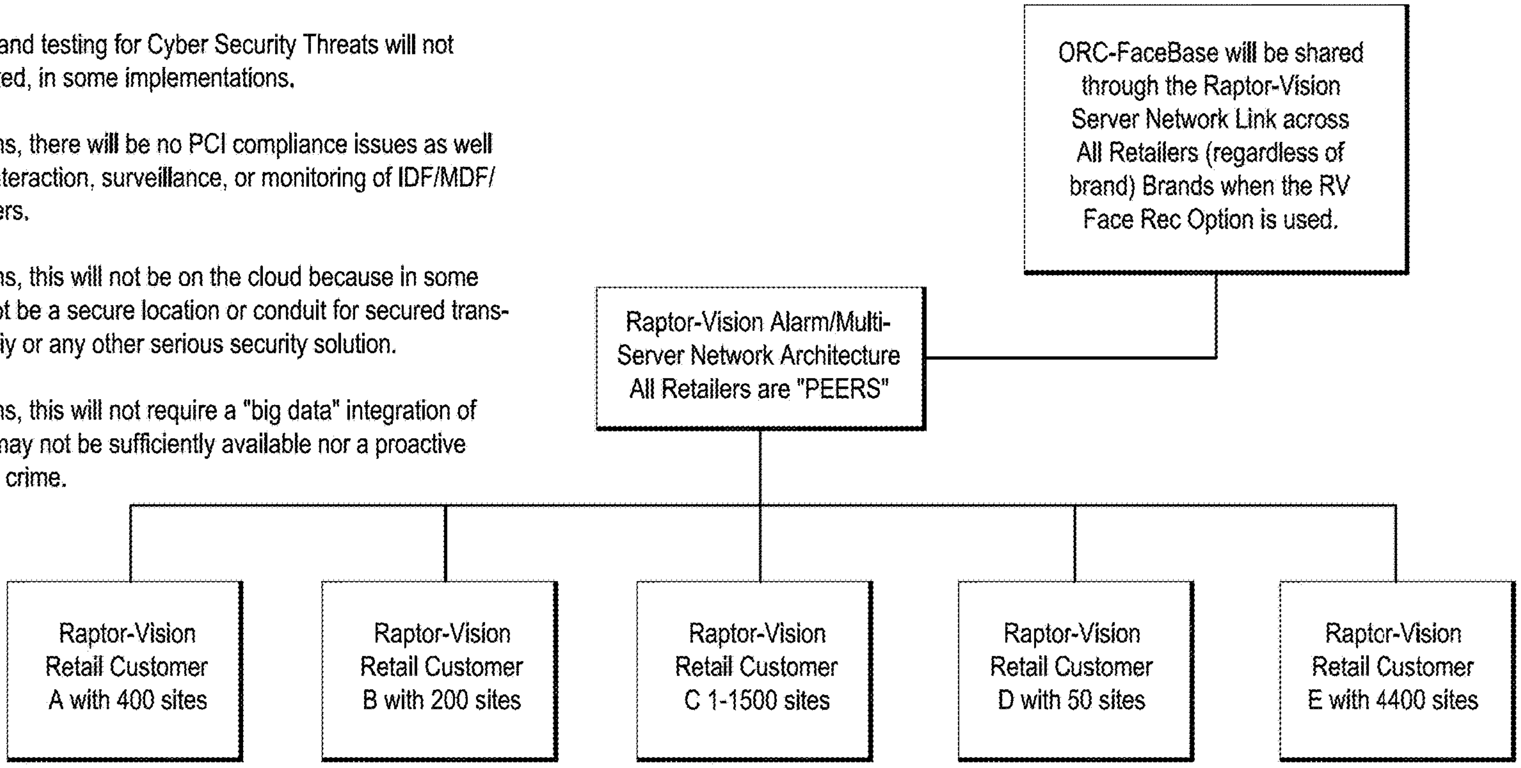

2000
2010
1440

VIDEO ANALYTICS SYSTEM FOR IDENTIFYING EVENTS

CROSS-REFERENCE TO RELATED APPLICATIONS

This application is a continuation of U.S. patent application Ser. No. 17/739,011, entitled “VIDEO ANALYTICS SYSTEM” and filed May 6, 2022, which is a continuation of U.S. patent application Ser. No. 16/698,806, entitled “VIDEO ANALYTICS SYSTEM” and filed on Nov. 27, 2019, which is a continuation of U.S. patent application Ser. No. 16/213,487, entitled “BEHAVIORAL INTRUSION DETECTION SYSTEM” and filed on Dec. 7, 2018, which is a continuation of U.S. patent application Ser. No. 16/056,303, entitled “BEHAVIORAL INTRUSION DETECTION SYSTEM” and filed on Aug. 6, 2018 (“the ’303 application”), which is a continuation-in-part of U.S. patent application Ser. No. 15/871,897, entitled “BEHAVIORAL THEFT DETECTION AND NOTIFICATION SYSTEM” and filed on Jan. 15, 2018, which claims priority under 35 U.S.C. § 119(e) to U.S. Provisional Application No. 62/577,650, entitled “BEHAVIORAL THEFT DETECTION AND NOTIFICATION SYSTEM” and filed on Oct. 26, 2017 (“the ’650 provisional application”), and to U.S. Provisional Application No. 62/612,259, entitled “BEHAVIORAL THEFT DETECTION AND NOTIFICATION SYSTEM” and filed on Dec. 29, 2017 (“the ’259 provisional application”), and the ’303 application also claims priority under 35 U.S.C. § 119(e) to the ’650 provisional application and the ’259 provisional application. Each of the above-identified patent applications are hereby incorporated by reference herein in their entireties.

BACKGROUND

Security systems are often installed to detect and/or deter crime. For example, a security system can be installed in a home, a bank, an office building, or any other type of structure. If crime is detected, the security system can be configured to sound an alarm, notify authorities, close doors, enable locks, and/or the like.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a system for deterring organized retail crime. The system comprises a camera positioned to monitor a merchandise area in a retail store, the merchandise area having one or more merchandise shelves, where the camera is configured to produce video footage comprising image frames that include at least a portion of the one or more merchandise shelves; a speaker positioned to deliver audio to the merchandise area; a store terminal comprising: a terminal display, a terminal speaker, and a terminal microphone; an alarm controller comprising: a hardware processor, and non-transitory computer-readable memory in communication with the hardware processor, the memory storing one or more threshold pixel difference criteria, a threshold breach distance value, a threshold breach time value, a threshold breach count value, and instructions executable by the processor to cause the alarm controller to: receive the video footage comprising the multiple image frames from the camera, compare a first group of pixels at a first location in a first image frame to a second group of pixels at the first location in a second image frame that is subsequent to the first image frame, identify a first breach into the one or more merchandise shelves based at least in part on a determination that a difference between the first group of pixels and the second group of pixels satisfies the one or more threshold pixel difference criteria, compare a third group of pixels at a second location in a third image frame to a fourth group of pixels at the second location in a fourth image frame, where the third image frame is subsequent to the second image frame, and where the fourth image frame is subsequent to the third image frame, identify a second breach into the one or more merchandise shelves based at least in part on a determination that a difference between the third group of pixels and the fourth group of pixels satisfies the one or more threshold pixel difference criteria, associate the first breach and the second breach together based at least in part on a determination that a distance between the first location and the second location is less than the threshold breach distance value, and based at least in part on a determination that a duration of time between the first breach and the second breach is less than the threshold breach time value, determine a potential theft event by at least identifying a number of associated breaches that satisfies the threshold breach count value, where the associated breaches are at locations within the threshold breach distance value and at times within the threshold breach time value, in response to the determination of the potential theft event, cause the speaker to broadcast an automated message to the merchandise area, and in response to the determination of the potential theft event, establish a communication link between the camera and the store terminal, to display video footage from the camera on the terminal display, and to enable audio communication from the terminal microphone through the speaker; and an alarm trigger system configured to send an alarm notification to an outside system in response to the determination of the potential theft event.

The system of the preceding paragraph can include any sub-combination of the following features: where the system further comprises a user interface configured to receive user input to change the threshold distance value, the threshold time value, and the threshold breach count value; where the system further comprises a user interface configured to receive user input to define a mask area in the image frames, where the alarm controller is configured to analyze the mask area of the image frames to identify the breaches; where the memory stores a threshold sweep distance value and a threshold sweep time value, and where the instructions are executable by the processor to cause the alarm controller to: compare corresponding groups of pixels at a first location in a first pair of image frames, and determine a difference between the corresponding groups of pixels, compare corresponding groups of pixels at a second location that is adjacent to the first location in a subsequent second pair of the image frames, and determine a difference between the corresponding groups of pixels, compare one or more corresponding groups of pixels at one or more further locations, which are each adjacent to a prior compared location, in one or more further pairs of the image frames, and determine differences between the corresponding groups of pixels, and determine the potential theft event by at least identifying a series of differences between corresponding groups of pixels across a series of adjacent locations in a series of the image frames, where the series of differences each satisfy the one or more threshold pixel difference criteria, where a distance across the series of adjacent locations satisfies the threshold sweep distance value, and where the series of image frames occur within the threshold sweep time value; where the alarm controller is configured analyze the video footage and identify individual person(s) and to determine the potential theft event based at least in part on a number of person(s) present at the merchandise area; where the system further comprises a display at the merchandise area, where the display has a first operating mode for displaying advertising information, where the display has a second operating mode for displaying one or more images to deter theft, where the display transitions from the first operating mode to the second operating mode in response to the determination of the potential theft event; where the store terminal has a terminal camera, and where the display in the second operating mode displays video footage from the terminal camera; where the store terminal is a video phone; where the system further comprises a facial recognition camera at an entrance to the retail store, where the alarm controller is configured to access a facial recognition data store with face information for suspected criminals, and where the alarm controller is configured to perform facial recognition analysis on images of people captured by the facial recognition camera to determine whether the people are suspected criminals; where the alarm controller is configured to send a notification to the store terminal in response to a determination that a person on one or more images captured by the facial recognition camera is a suspected criminal; where the system further comprises one or more motion detectors at the merchandise area, and where the alarm controller is configured to determine the potential theft event based at least in part on information from the one or more motion sensors; where the system further comprises one or more seismic sensors at the merchandise area, and where the alarm controller is configured to determine the potential theft event based at least in part on information from the one or more seismic sensors; and where a public address (PA) system of the store comprises the speaker, and where the alarm controller is configured cause the PA system to broadcast the automated message in response to the determination of the potential theft event.

Another aspect of the disclosure provides a security system comprising: a camera positioned to monitor a merchandise area, where the camera is configured to produce video footage comprising image frames that include at least a portion of the merchandise area; a speaker positioned to deliver audio to the merchandise area; and an alarm controller configured to: receive the video footage comprising the multiple image frames from the camera, apply a mask to the image frames to define a monitored area that comprises a subset of pixels in the image frames, determine a potential theft event based at least in part on: (a) detecting a threshold number of breaches in the monitored area within a threshold amount of time, where the alarm controller is configured to detect a breach by comparing a group of pixels within the monitored area in a first image frame with a corresponding group of pixels within the monitored area in a second image frame that is subsequent to the first image frame, or (b) detecting at least one sweep action by identifying a series of changes between corresponding groups of pixels across a series of adjacent locations in a series of the image frames, where the series of adjacent locations extend across a distance in the image frames that satisfies a threshold distance, and where the series of image frames occur within a threshold amount of time, and cause the speaker to broadcast an audio message to the merchandise area in response to the determination of the potential theft event.

The security system of the preceding paragraph can include any sub-combination of the following features: where the alarm controller is configured to determine the potential theft event based at least in part on detecting the threshold number of breaches within the threshold amount of time; where the alarm controller is configured to determine the potential theft event based at least in part on detecting the sweep action; where the alarm controller is configured to cause the speaker to automatically broadcast a prerecorded message in response to the determination of the potential theft event; where the system further comprises a terminal that includes a terminal display, where the alarm controller is configured to establish a communication link between the camera and the terminal in response to the determination of the potential theft event to display video footage from the camera on the terminal display; where the terminal has a terminal microphone for receiving a voice message from a user at the terminal, and where the audio message broadcast by the speaker is the voice message received by the terminal microphone; where the terminal comprises a video phone; where the alarm controller is configured analyze the video footage and determine a number of people in the area, and where the alarm controller is configured to determine the potential theft event based at least in part on the determined number of people in the area; where the system further comprises a display visible at the area, where the display has a first operating mode and a second operating mode for displaying one or more images to deter theft, where the display transitions from the first operating mode to the second operating mode in response to the determination of the potential theft event; and where a terminal has a terminal camera, and where the display in the second operating mode shows video footage from the terminal camera.

Another aspect of the disclosure provides a method for setting up a security system in a retail store. The method comprises: providing an alarm controller configured to process video footage and determine a potential theft event based at least in part on (a) multiple breaches detected in a monitored area of the video footage, or (b) a sweep action detected in the monitored area of the video footage; positioning a camera in the retail store to monitor a merchandise area having one or more merchandise shelves; establishing communication between the camera and the alarm controller so that the camera sends video footage to the alarm controller for analysis; accessing at least one image from the camera and use a user interface to position a mask to define the monitored area for the video footage from the camera; establishing communication between the alarm controller and a speaker positioned to deliver audio to the merchandise area, where the alarm controller is configured to cause the speaker to automatically broadcast a prerecorded message to the merchandise area in response to the determination of the potential theft event; providing a store terminal comprising: a terminal display, and a terminal microphone; and establishing communication between the alarm controller and the store terminal, where the alarm controller is configured to establish a communication link between the camera and the store terminal in response to the determination of the potential theft event to display video footage from the camera on the terminal display, and where the alarm controller is configured to enable audio communication from the terminal microphone to the speaker in response to the determination of the potential theft event.

The method of the preceding paragraph can include any sub-combination of the following features: where an edge of the monitored area generally conforms to a transition in the at least one image from the camera from the one or more merchandise shelves to an aisle; where the method further comprises using a user interface to specify a threshold breach count, a threshold breach time, and a threshold breach distance, where the alarm controller is configured to determine the potential theft event based at least in part on identifying a number of breaches in the monitored area of the video footage that are within the threshold breach distance and within the threshold breach time, where the number of breaches satisfies the threshold breach count; where the method further comprises using a user interface to specify a threshold sweep time and a threshold sweep distance, where the alarm controller is configured to determine the potential theft event based at least in part on identifying a series of changes between pixels in a series of image frames of the video footage corresponding to an object moving across the monitored area for at least the threshold sweep distance within the threshold sweep time; where the method further comprises positioning a facial recognition camera at an entrance to the retail store, where the alarm controller is configured to access a facial recognition data store with face information for suspected criminals and perform facial recognition analysis on images of people captured by the facial recognition camera to determine whether the people are suspected criminals, and where the alarm controller is configured to send a notification to the store terminal in response to a determination that a person on one or more images captured by the facial recognition camera is a suspected criminal; where the method further comprises positioning a display to be visible at the merchandise area and establishing communication between the display and the alarm controller, where the display has a first operating mode for displaying advertising information, where the display has a second operating mode for displaying video footage from a terminal camera of the store terminal, where the alarm controller is configured to transition the display from the first operating mode to the second operating mode in response to the determination of the potential theft event; and where the method further comprises providing an alarm trigger in communication with the alarm controller, where the alarm trigger is configured to send an alarm notification to an outside system in response to the determination of the potential theft event.

Another aspect of the disclosure provides a system for deterring organized retail crime. The system comprises a camera positioned to monitor a merchandise area in a retail store; a speaker positioned to deliver audio to the merchandise area; a store terminal comprising: a terminal display, a terminal speaker, and a terminal microphone; an alarm controller configured to: receive video footage comprising multiple frames from the camera, analyze the frames of the video footage and determine a potential theft event based at least in part on multiple breaches into a monitored portion of the frames or a sweep action into the monitored portion of the frames, in response to the determination of the potential theft event, broadcast an automated message to the merchandise area using the speaker, and in response to the determination of the potential theft event, establish a communication link between the camera and the store terminal, to display video footage from the camera on the terminal display, and to enable audio communication from the terminal microphone to the speaker at the merchandise area; and an alarm trigger system configured to send an alarm notification to an outside system in response to the determination of the potential theft event.

The system of the preceding paragraph can include any sub-combination of the following features: where the alarm controller is configured to determine the potential theft event based at least in part on a threshold number of breaches into the monitored portion of the frames within a threshold area and within a threshold amount of time; where the threshold number of breaches is user-adjustable, where the threshold area is user-adjustable, and where the threshold amount of time is user-adjustable; where the alarm controller is configured analyze the video footage and identify individual person(s) and to determine the potential theft event based at least in part on a number of person(s) present at the merchandise area; where the system further comprises a display at the merchandise area, where the display has a first operating mode for displaying advertising information, where the display has a second operating mode for displaying image(s) to deter theft, where the display transitions from the first operating mode to the second operating mode in response to the determination of the potential theft event; where the store terminal has a terminal camera, and where the display in the second operating mode shows video footage from the terminal camera; where the store terminal is a video phone; where the system further comprises a facial recognition camera at an entrance to the retail store, where the alarm controller is configured to access a facial recognition data store with face information for suspected criminals and to perform facial recognition analysis on images of people captured by the facial recognition camera to determine whether the people are suspected criminals; where the alarm controller is configured to send a notification to the store terminal in response to a determination that a person on image(s) captured by the facial recognition camera is a suspected criminal; where the system further comprises one or more motion detectors at the merchandise area, and where the alarm controller is configured to determine the potential theft event based at least in part on information from the one or more motion sensors; where the system further comprises one or more seismic sensors at the merchandise area, and where the alarm controller is configured to determine the potential theft event based at least in part on information from the one or more seismic sensors; and where a public address (PA) system of the store comprises the speaker, and where the alarm controller is configured to broadcast the automated message over the PA system in response to the determination of the potential theft event.

Another aspect of the disclosure provides a security system comprising: a camera positioned to monitor an area; a speaker positioned to deliver audio to the area; an alarm controller configured to: receive video footage from the camera, and analyze the video footage and determine a potential theft event based at least in part on video footage from the camera, where the speaker is responsive to the determination of the potential theft event to broadcast an audio message to the area.

The security system of the preceding paragraph can include any sub-combination of the following features: where the alarm controller is configured to broadcast a prerecorded message automatically using the speaker in response to the determination of the potential theft event; where the system further comprises a terminal that includes a terminal display, where the alarm controller is configured to establish a communication link between the camera and the terminal in response to the determination of the potential theft event to display video footage from the camera on the terminal display; where the terminal has a terminal microphone for receiving a voice message from a user at the terminal, and where the audio message broadcast by the speaker is the voice message received by the terminal; where the terminal comprises a video phone; where the alarm controller is configured to determine the potential theft event based at least in part on a number of breaches into a monitored area of the video footage within an amount of time; where the alarm controller is configured to determine the potential theft event based at least in part on a sweep action into a monitored area of the video footage; where the alarm controller is configured analyze the video footage and determine a number of people in the area, and where the alarm controller is configured to determine the potential theft event based at least in part on the determined number of people in the area; where the system further comprises a display at the area, where the display has a first operating mode and a second operating mode for displaying image(s) to deter theft, where the display transitions from the first operating mode to the second operating mode in response to the determination of the potential theft event; and where the terminal has a terminal camera, and where the display in the second operating mode shows video footage from the terminal camera.

Another aspect of the disclosure provides a video monitoring system. The video monitoring system comprises: a camera positioned to monitor an area; and an alarm controller configured to: receive video footage comprising multiple frames from the camera, the video footage comprising a monitored portion of the frames, and analyze the frames of the video footage and determine a potential theft event based at least in part on a threshold number of breaches into the monitored portion of the frames within a threshold area and within a threshold amount of time.

The video monitoring system of the preceding paragraph can include any sub-combination of the following features: where the threshold number of breaches is user-adjustable, where the threshold area is user-adjustable, and where the threshold amount of time is user-adjustable; where the camera is positioned to monitor a merchandise area in a retail store having an aisle and one or more shelves, and where the monitored portion of the frames of the video footage includes the one or more shelves; where the alarm controller is configured to broadcast an automated audio message to the area using a speaker in response to the determination of the potential theft event; where the alarm controller is configured to establish a communication link between the camera and a terminal in response to the determination of the potential theft event, to display video footage from the camera on a display of the terminal, and to enable audio communication from a microphone of the terminal to a speaker to deliver audio to the area; where the system further comprises an alarm trigger system configured to send an alarm notification to an outside system in response to the determination of the potential theft event; and where the alarm controller is configured analyze the video footage and identify individual person(s) and to determine the potential theft event based at least in part on a number of person(s) present at the area.

BRIEF DESCRIPTION OF DRAWINGS

Certain embodiments will be discussed in detail with reference to the figures, which are provided for illustrative purposes and the embodiments are not limited to the specific implementations illustrated in the figures. In some instances in the figures, the system for detecting and/or deterring crime described herein is referred to as Raptor-Vision or RV.

FIGS. 1-10 are block diagrams that schematically show features of example embodiments of systems for detecting and/or deterring crime.

FIG. 20 illustrates the exterior of an example commercial or industrial building at which the system of FIG. 14 can detect potential crime, such as tagging, graffiti, forcible entry, and/or the like.

DETAILED DESCRIPTION OF SPECIFIC EMBODIMENTS

Figure 1:
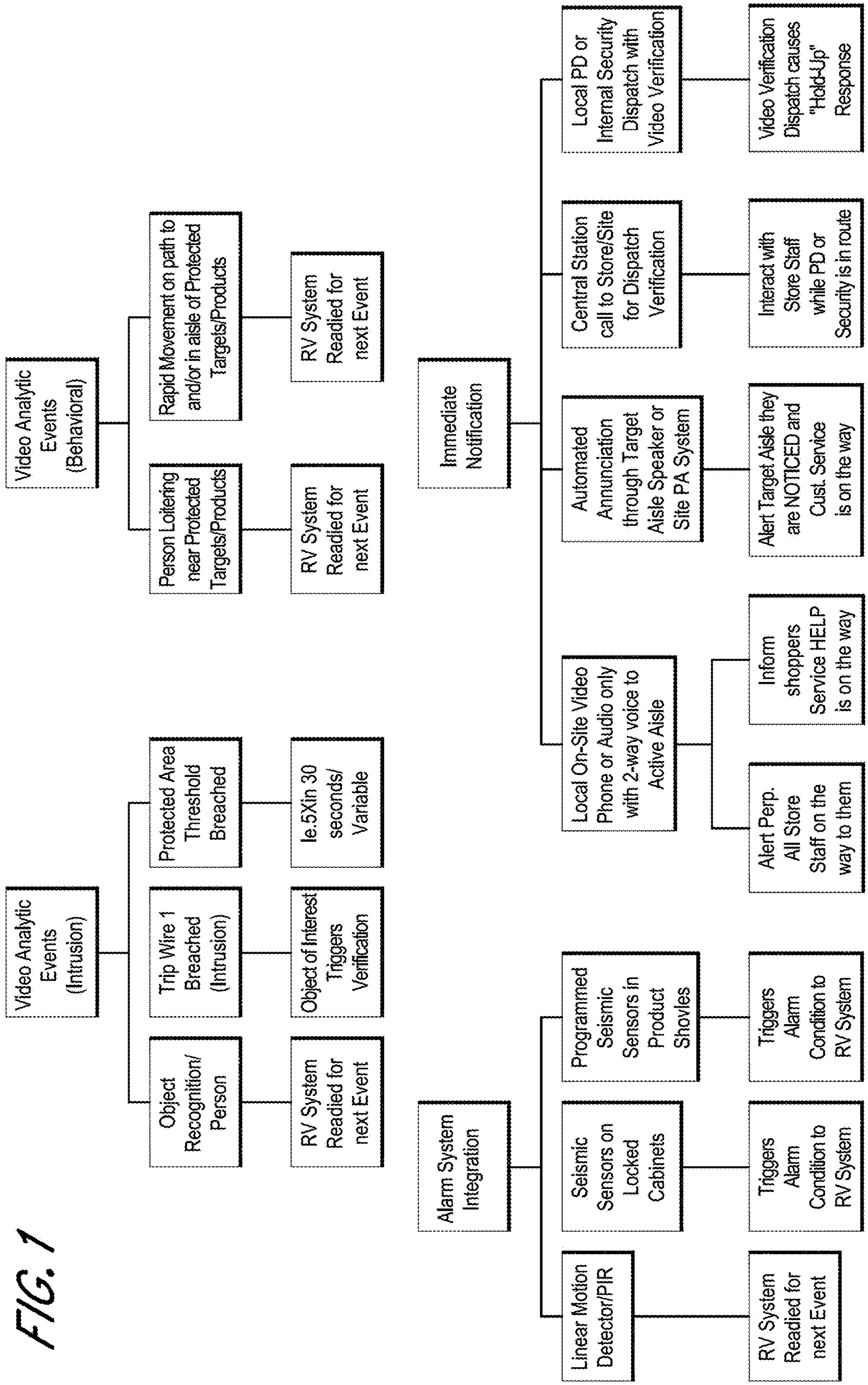
Figure 2:
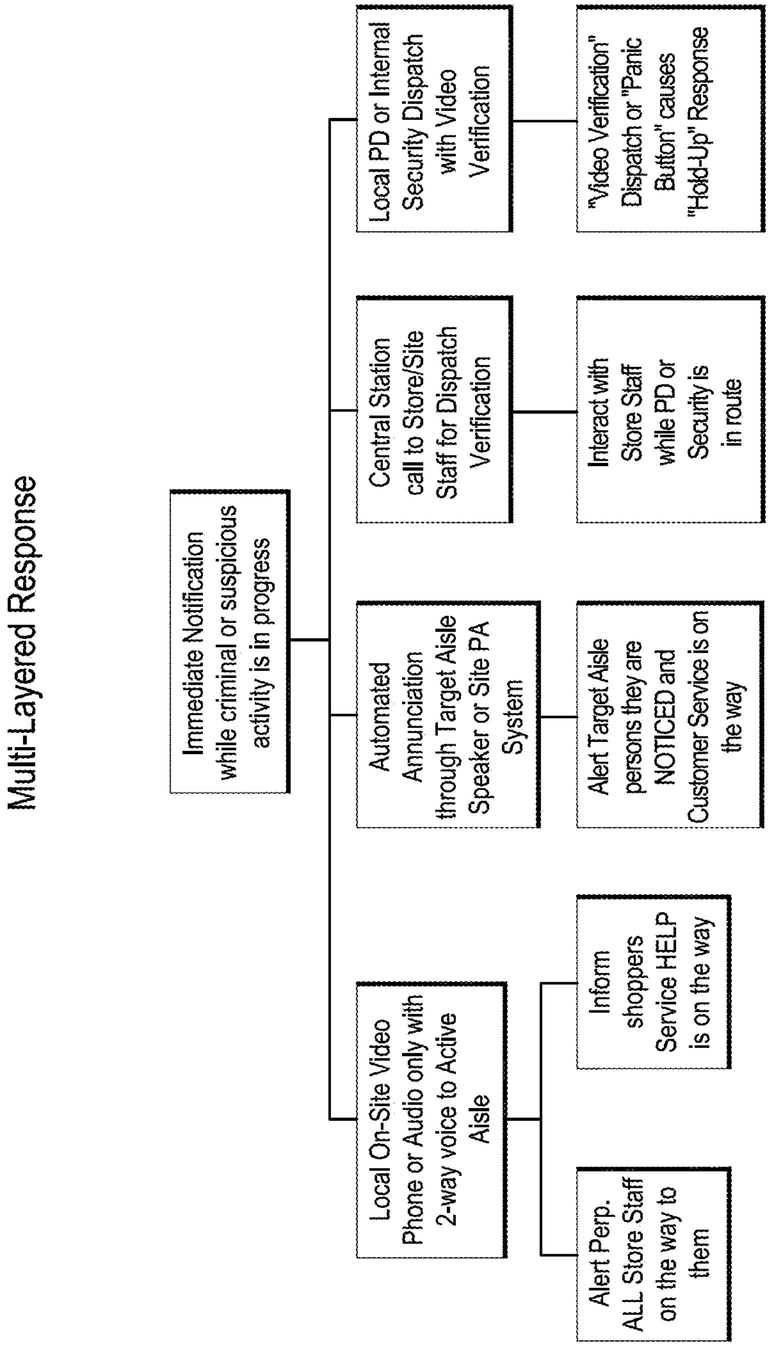

Aspects of this disclosure relate to systems and methods specifically designed to detect, deter, and/or stop theft activities described herein, such as Organized Retail Crime (ORC), as well as to detect, deter, and/or stop other perpetrators at any retail, industrial, or any other commercial site, or any other suitable location. Aspects of this disclosure relate to systems and methods for monitoring human behavior and detecting ORC or other theft events or other criminal activity. Aspects of this disclosure also relate to systems and methods for monitoring human behavior and detecting intrusions for inventory management and/or criminal activity detection purposes.

Certain example embodiments are discussed below for illustrative purposes. The embodiments are not limited to the specific implementations recited herein. Embodiments may include several novel features, no single one of which is essential or solely responsible for the desirable attributes discussed herein.

Embodiments disclosed herein can relate to systems and methods for detecting and/or deterring theft, such as organized retail crime (ORC). An example of an organized retail crime event is described below. Two thieves enter a retail store. A first thief obtains a shopping cart and approaches an area with high-value merchandise, such as liquor, perfume, etc. The first thief loads the cart with high value merchandise quickly while the second thief stands nearby to watch for security or other threats. Then the two thieves exit the retail store quickly with the stolen merchandise, which is often later resold in grey markets or sub-prime distributors. Although some systems and methods are discussed herein in connection with detecting and/or deterring organized retail crime, the systems and methods can apply to other types of crime, such as shoplifting by a single thief acting alone, etc.

Conventional security systems have difficulty detecting and/or deterring ORC. For example, conventional security systems are generally set up to detect and/or deter ORC at store entrances and/or exits (e.g., via the use of metal detectors, radio frequency identification (RFID) detectors, etc.). However, attempting to detect and/or deter ORC at store entrances and/or exits can be problematic because the initial crime of, for example, stealing items has already been committed. By the time the ORC is detected, the perpetrator may already be outside the store (and therefore be more likely to evade authorities). Some conventional security systems include cameras. However, the cameras serve as passive devices that record events for review by authorities after ORC has already occurred. Thus, these cameras are not useful for detecting ORC while the crime is taking place such that the perpetrator can be apprehended and/or the stolen items can be recovered. In general, the components included in conventional security systems, such as the metal detectors, RFID detectors, cameras, etc., are not sufficient by themselves of detecting and/or deterring ORC when the initial crime is actually taking place. Building a security system that can actually detect ORC when the initial crime is taking place may significantly reduce the likelihood that the perpetrator can evade authorities and/or increase the likelihood that stolen items can be recovered.

Accordingly, a security system can use video analytics and/or other input parameters to identify a theft event (e.g., ORC) or suspicious behavior, and in some embodiments the system can take remedial action in response. For example, video analytics can be used to determine that a person has reached into a shelf multiple times at a rate above a threshold (e.g., five times within thirty seconds, although other rates and thresholds can be used), which can indicate that a thief is quickly removing merchandise from the shelf. The video analytics can also determine that a person has reached into a shelf via a sweeping action, which can indicate that a thief is gathering and removing a large quantity of merchandise from the shelf in one motion. The video analytics can also determine that a person is loitering near an area of high-value merchandise. Video analytics can also be used to determine that a person is moving above a threshold speed towards, or within, or away from the high-value merchandise area. Identification of one or more of these events can be used to determine that a theft event is occurring. One or multiple events can contribute to the determination that a theft event is occurring. For example, activity at the merchandise shelf can trigger an identification of a theft event if a person is loitering nearby even if that same activity at the merchandise shelf would not trigger an identification of a theft event when no loitering is happening. One or multiple events can also enhance the likelihood that a determination is made that a theft event is occurring. For example, the threshold for determining whether activity at the merchandise shelf would trigger an identification of a theft event can be relaxed if a person is loitering nearby. A score can be determined based on one or more of these identified events, and if the score satisfies a threshold (e.g., above a threshold value), then the system can determine that a theft event is occurring. Multiple factors disclosed herein can contribute to the calculated score which can trigger a determination of a theft event, or a single factor can be sufficient to trigger the determination of a theft event (e.g., overlapping factors or single factor determinations).

The systems disclosed herein can identify theft events with high confidence. In some cases, multiple factors can be used to verify theft events. In some implementations, the system can determine a confidence level for the determination of a theft event, or can determine theft events of different categories or types. For example, if a threshold score of 50 is used for identifying a theft event, then a score of 52 can be determined to be a theft event with low confidence while a score of 75 can be determined to be a theft event with high confidence. The system can take different action depending on the confidence level or category of the theft event determination or depending on the calculated score. For example, a theft event having a low confidence level or of a first category (e.g., a score that satisfies a first threshold (e.g., 50) but not a second threshold (e.g., 70)) can cause the system to take less serious action(s), such as privately alerting score security or other store personnel (e.g., via a terminal), storing or flagging portions of the video relating to the theft event, activating or readying other sensors or systems, and/or providing a non-threatening automated message (e.g., "customer service to the liquor department"), or providing no automated message. A theft event having a high confidence level or of a second category (e.g., a score that satisfied the second threshold (e.g., 70)) can cause the system to take more serious action(s), such as alerting law enforcement, providing an automated message to the target area, and/or providing a more serious automated message (e.g., "security to the liquor department").

Seismic sensor(s) can be used identify a theft event. Seismic sensors can be positioned on locked cabinet(s) and/or on product shelve(s). A seismic sensor can output information when products are removed from a shelf, for example. The level of shaking indicated by the seismic sensor(s) can be used in identifying a theft event. Generally, products are removed from the shelf more quickly and with less care during a theft event than during normal shopping behavior, which can be manifest by more shaking of the seismic sensor(s). Also, in some cases, the rate at which products are removed from the shelf (e.g., as indicated by the seismic sensor(s) and/or video analytics) can be used to determine a theft event, such as product removal over a threshold rate and/or number (e.g., five times within 30 seconds, although other rates can be used). In some embodiments, the seismic sensor(s) can indicate a large spike when a cabinet or gondola is seriously disrupted or jolted, as often occurs during a theft, and the system can use this information in determining a theft event. The seismic sensor(s) can be used to confirm the information provided by the video analytics, in some embodiments. Information from the seismic sensor(s) (e.g., amplitude of shaking, rate of shaking events, and/or number of shaking events) can be used in determining the score. Door contact sensors can be used to determine whether cabinet doors are closed or open, and this information can be used in identifying a theft event (e.g., in calculating the score).

Other inputs can be used to identify a theft event. For example, a threshold sensor, such as an optical sensor, can be used to determine when an object has crossed a threshold (e.g., the front of a merchandise shelf). If someone reaches into the shelf and triggers the threshold sensor enough times and/or at a threshold rate (e.g., five times within 30 seconds), that can be used to identify a theft event). The threshold sensor can be a passive infrared sensor (PIR), a linear motion detector, a curtain motion detector, etc. Information from the threshold sensor(s) can be used to determine the score.

When the system makes a theft event determination, the system can take action to prevent the crime. The system can provide an alert to a store/site terminal that is located in the retail store or other site using the system. Although some embodiments are discussed in connection with a store (e.g., using a store terminal), the same or similar systems and methods can be used for other sites that are not stores (e.g., a warehouse). A manager, security personnel, or other employee can interact with the terminal to take action. The terminal can present video and/or sound information of the theft event. Live video and/or sound of the target area can be provided to the terminal, which can enable the store personnel to view the current actions of the suspect(s). Past video and/or sound of the target area can be accessible via the system. The system can store the video and/or sound associated with a detected potential theft event. The past video and/or sound can be provided (e.g., through email, text, or other suitable data transfer manner) to a remote device. In some cases a local or remote computer can be used to access video and/or sound information stored in the system. In some cases, the past video and/or sound can optionally be provided to the store/site terminal. For example, the past video and/or sound around the time of the event(s) that triggered the theft event determination can be stored and/or flagged. For example, if a theft event is identified at an event time (e.g., 3:05:46), the system can store, or flag, or send video of the location of the theft event starting at an amount of time before the event time to an amount of time after the event time (e.g., from 3:05:41 to 3:05:51). The system can store video so that if a theft event is triggered, the system can access the past video from the area during the time before and/or after the theft event was triggered. In some cases, the terminal can optionally present both the live video and the past video (e.g., simultaneously on a display).

The terminal can used to communicate with the suspects. For example, an input element (e.g., a button) can be actuated to engage a communication link between the terminal and a communication device (e.g., a speaker and/or display) at the target area. The user can actuate the input element and provide an audio message to the suspect(s) via a speaker, such as: "We see that you are very interested in our selection of perfumes. A service manager is on the way to help you." Two-way voice communication can be used, which can enable the user to converse with the suspect(s). This can be used to assess whether a theft is actually occurring, as opposed to innocent behavior, and this can also be used to keep the suspect(s) busy or to delay the theft. In some implementations, a display can be located at the target area and can be used to display an image or video to the suspect(s). For example, the terminal can include a camera or video camera and can communicate with the display at the target area to display an image or video of the store personnel at the terminal. The system can enable two-way video and/or audio communication between the terminal and the target area. In some embodiments, the terminal can be located off-site at a location remote to the store. For example, a centralized monitoring station can be used to monitor multiple stores.

In some embodiments, an automated message can be delivered to the target area when a theft event has been determined. The message can be an audio message, which can be delivered through a speaker at the target area, or over a public announcement or public address (PA) system of the store. In some embodiments, the system can provide a notification to the terminal when a theft event has been identified. A user can use the terminal to communicate with the suspect(s), as discussed herein, to trigger an alarm, or take other responsive action. A user can provide input to disregard the theft event (e.g., in the event of a false positive). If no input is provided within an amount of time (e.g., 10 seconds), then the system can deliver the automated message to the target area. Thus, if the store personnel are not available at the terminal when the theft event is identified, the system can have a default responsive action. In some embodiments, an automated message can be delivered when the theft event is identified by the system, without delay. In some cases, the user can follow up with additional communication to the suspect(s), such as using the terminal (e.g., for two-way communication). Different automated responses (e.g., audio recordings) can be used for different target areas in the store, or for different types of triggered events. For example, a different message can be used if one suspect is identified or if multiple suspects are identified, and a different message can be applied for the liquor section and perfume section in the store, etc. The system can take multiple actions when a theft event is identified, such as providing an immediate automated audio message (e.g., which in some cases can be chosen from a set of pre-recorded messages based on the parameters or triggers or location of the theft event) through a local speaker at the target area and/or over a PA system, providing a notification to a local terminal in the store (e.g., to enable live communication from store personnel, such as via a video phone), and/or providing a report to a remote central security center.

In some embodiments, the display at the target area can have a first operating mode when no theft event is detected. For example, the display can be used to display advertising information, such as specifically related to the high-value merchandise in the target area. When a theft event is identified, the display can transition to a second operating mode to display an image or video configured to deter theft, which can be a video communication from the terminal, or an automated message, or an alert (e.g., a flashing red screen).

The system can include a security alarm system (e.g., including a security panel), which can notify a central security station that a theft event was detected at the store. The notification to the central security station can include video footage of the theft event. Personnel at the central security station can contact the store to verify the theft event and/or to inform the store personnel regarding the status of law enforcement dispatch. The system can contact (e.g., directly, or through the central security station) law enforcement dispatch (e.g. the local police department) to report the theft event, and the report can include video footage verifying the theft event. Video verification can result in rapid response from law enforcement (e.g., a "hold-up alarm" type response). The system can contact law enforcement (e.g., local police department), such as through the central security center (e.g., simultaneously) to report the theft event.

Figure 3:
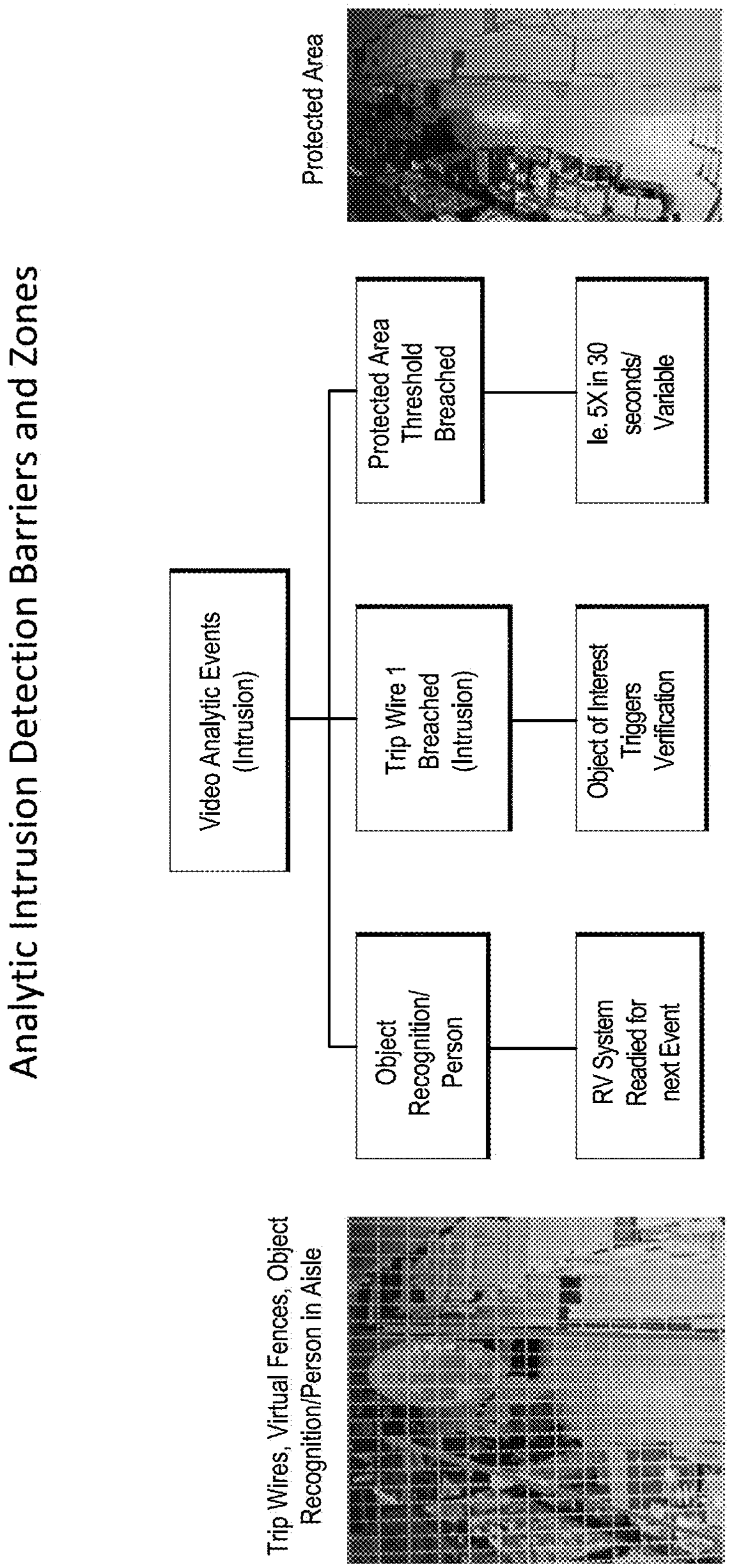
Figure 4:
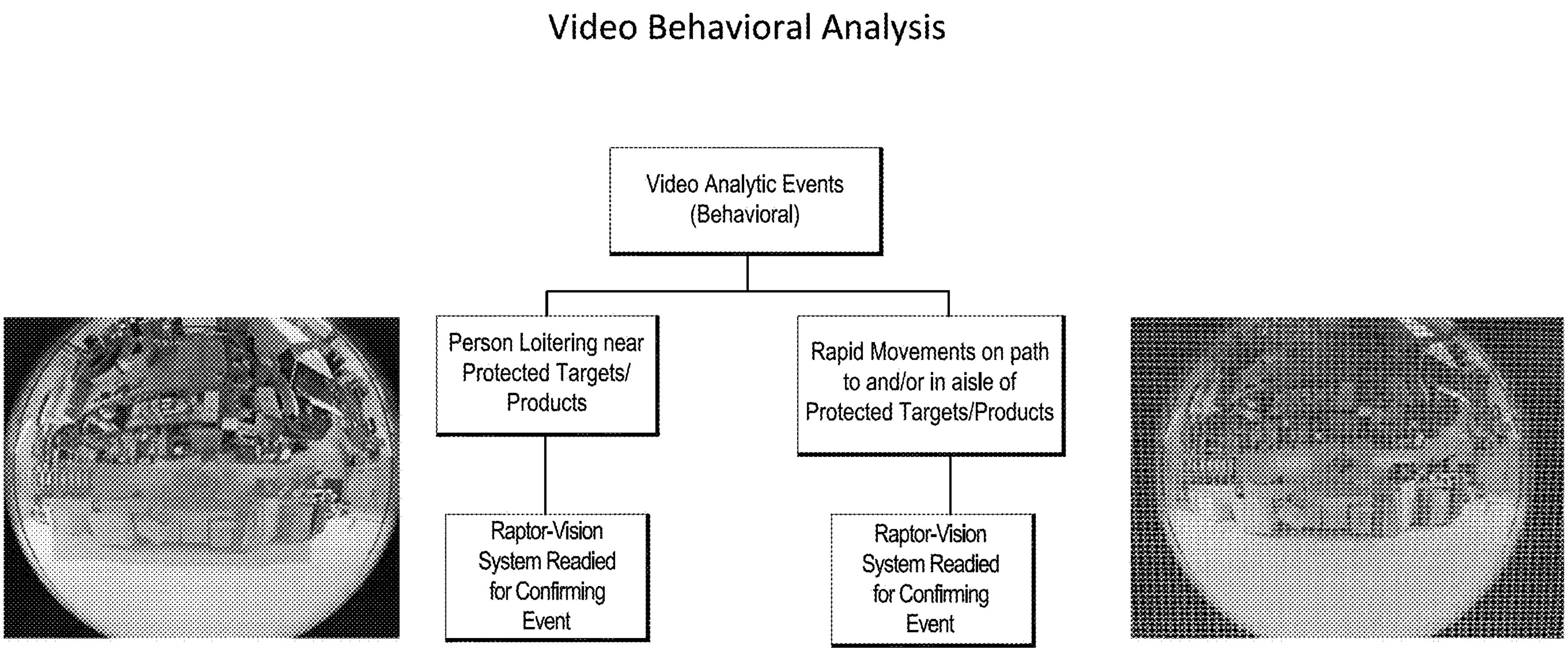
Figure 5:
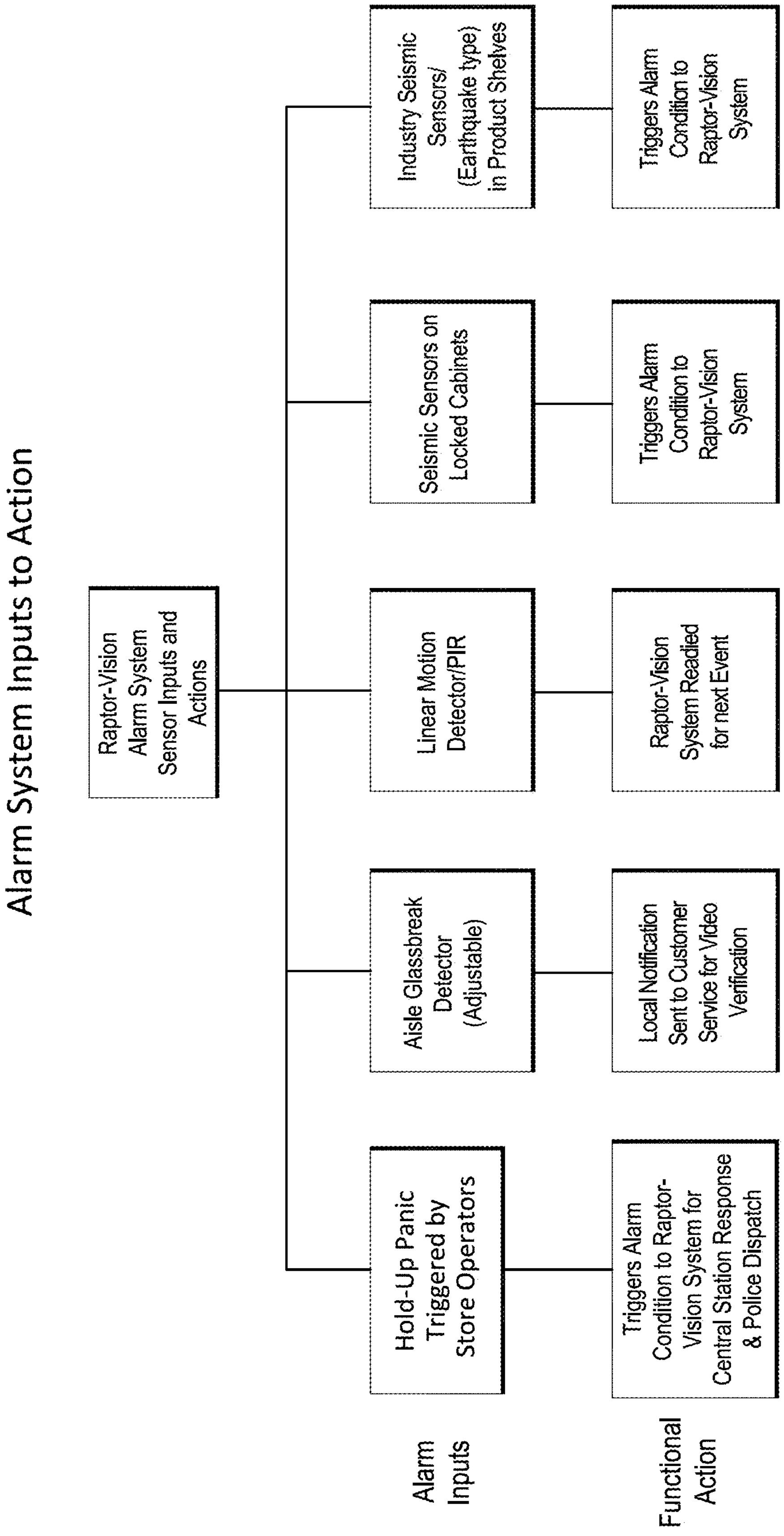
Figure 6:
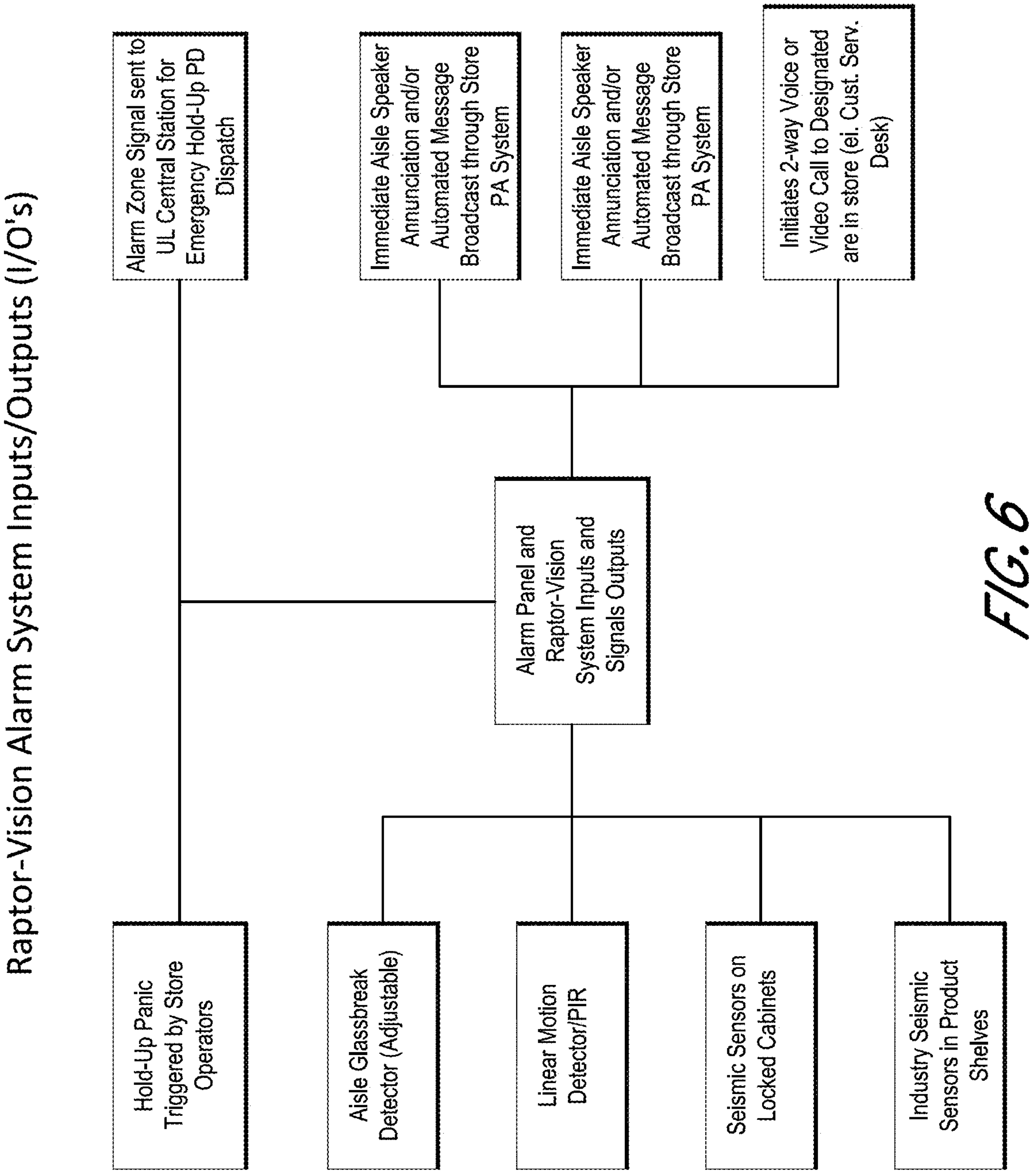
Figure 7:
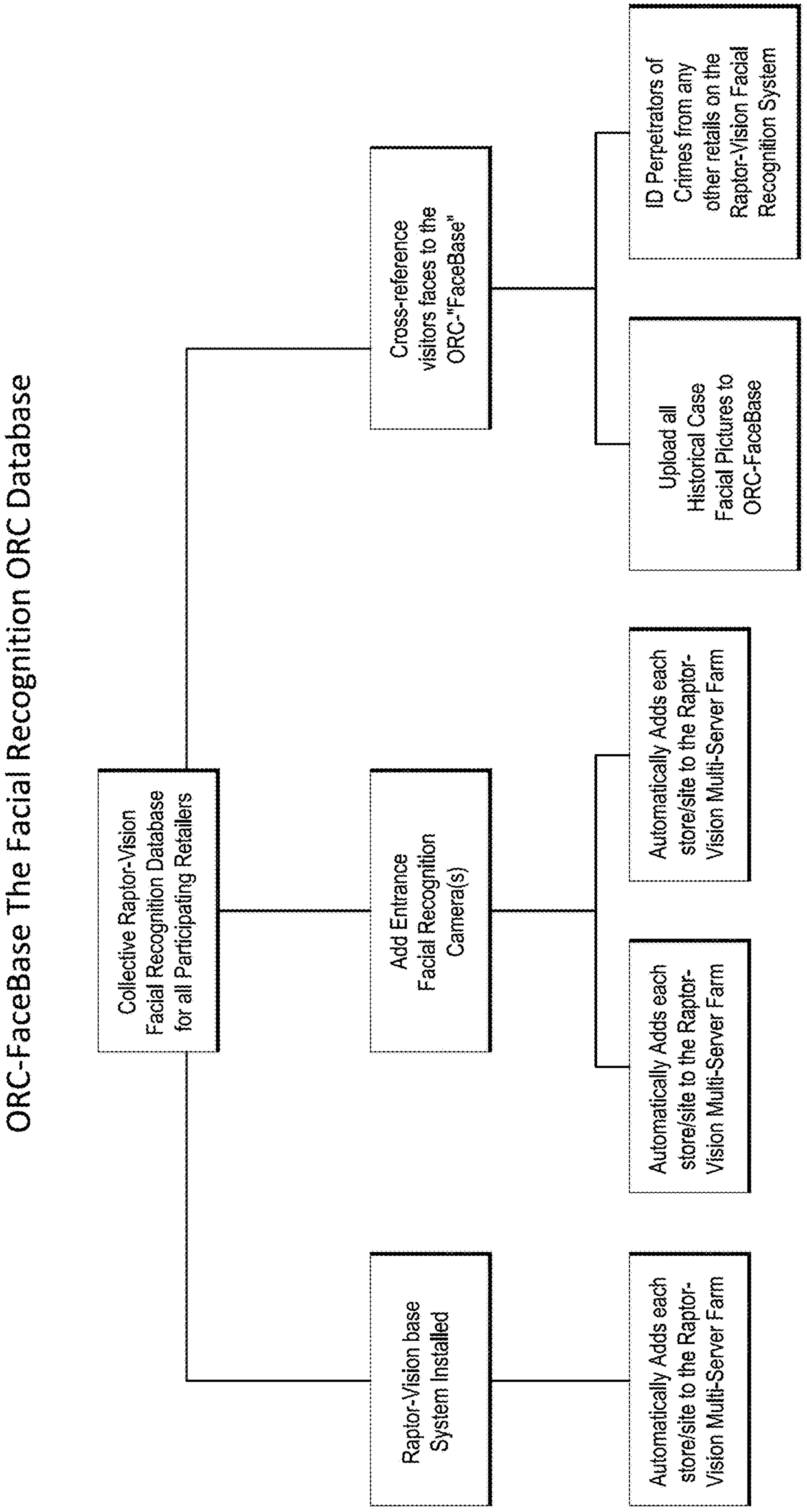
Figure 8:
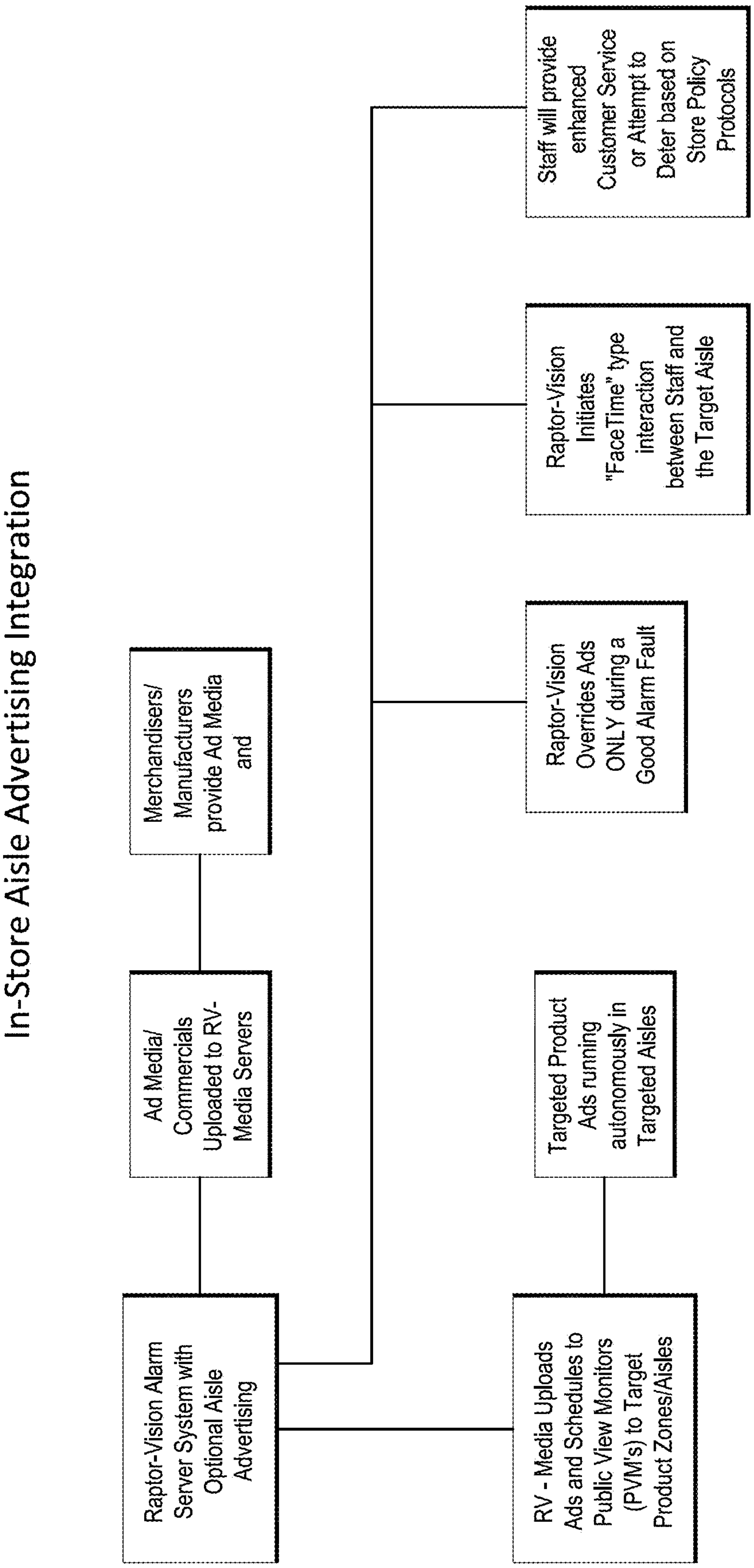
Figure 10:
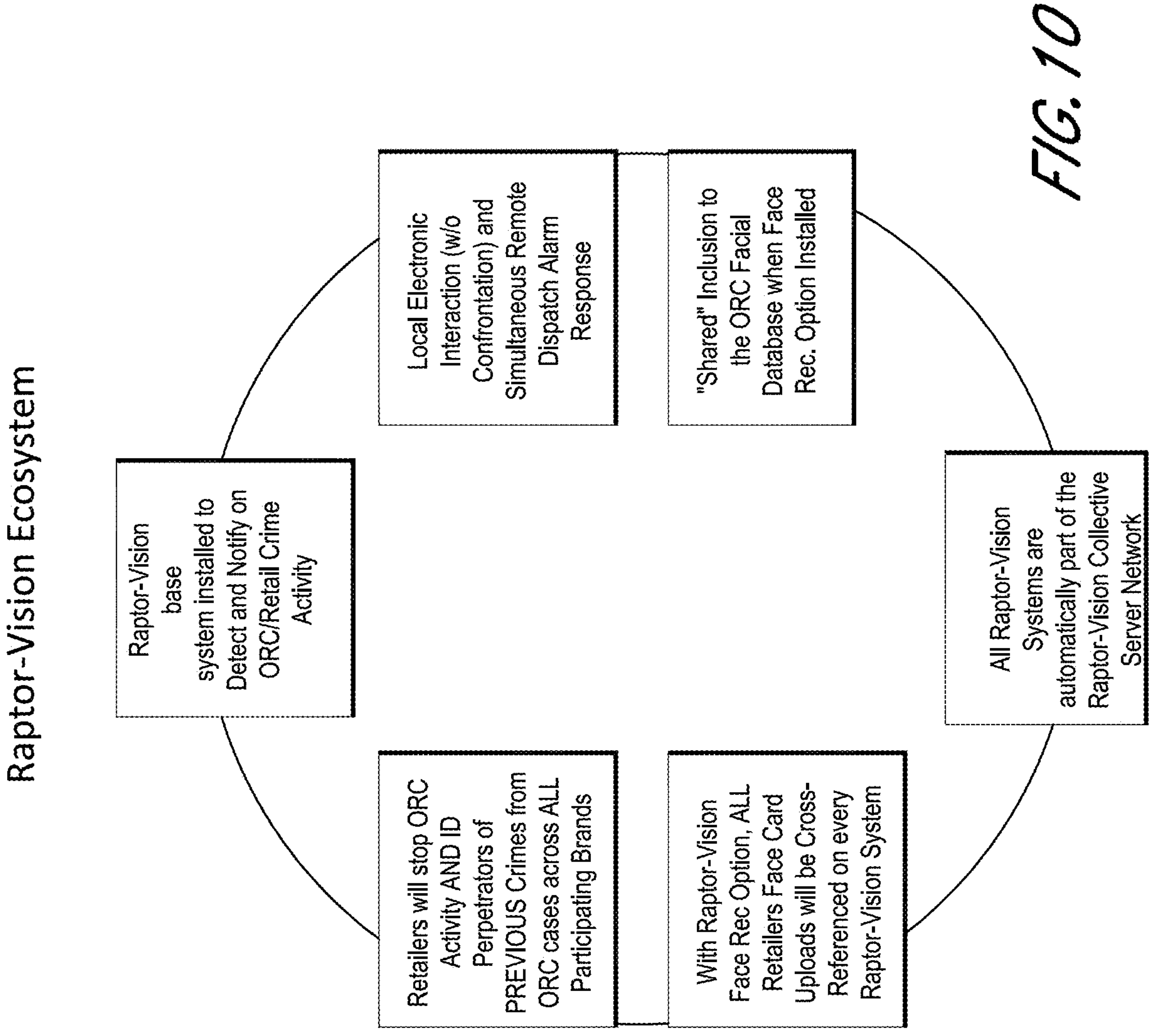

With reference to FIG. 3, the video analytics can perform object recognition, such as to identify a person in the target area (e.g., in the aisle of the store with high-value merchandise, where the aisle can be an area in front of one shelf or an area between two or more shelves). The position of the camera and the video analytic software of the system can be configured to define virtual tripwires or virtual fences in the video area. When an object (e.g., a part of a person) moves across the virtual tripwire or fence or merely breaches the virtual tripwire or fence, a breach event can be logged. The system can have a threshold number of breach events and/or a threshold breach event rate, which can be used to trigger a theft event in the system, as discussed herein. The number of breach events and/or the breach event rate can be used in determining a score (e.g., along with other factors like loitering, fast movement, seismic sensor data, threshold sensor data, crowd detection data, etc.). The position of the camera and the video analytic software can define protected areas, and movement of an object into the protected area can be logged as a breach event.

The system can include one or more cameras having wide angle lenses for monitoring a larger area around the protected area(s) or virtual fences, and this larger area can be monitored for loitering and/or fast moving objects towards, inside, or away from the target area(s). As discussed, the video analytic software can perform object recognition to identify a person.

In some implementations, the security system can use facial recognition video analytics to identify individual criminals and/or past perpetrators. In some cases, at least one camera configured to be used for facial recognition can be used, and can be positioned, for example, at an entrance of the store so that the camera can capture images of the faces of people entering the store. The system can access a database (e.g., a facial recognition data store, such as facial recognition data store 1432, stored locally or stored remotely and accessed over a network, such as a private retail network) of face information for suspected criminals. If a person commits a crime, images of that person captured by the cameras in the store can be used to create face information in the database. Then when that same person later enters a store, the camera can capture an image of the person's face and compare it to the face information in the database. The system can determine that the person who entered the store is the same person that had previously committed a crime. The system can notify the store security, manager, or other store personnel that the suspected criminal is in the store. When the previous crime was committed in a different store (e.g., a different location of the same store brand, or a different store brand, which may also use a similar security system), the system can notify the store security, manager, or other store personnel from that different store regarding the location of the suspected criminal. The system can contact the central security center (e.g., simultaneously) to report the criminal to law enforcement (e.g., local police department) and/or any investigator with an existing case involving the identified suspect. The report can include photo or video evidence of the current location of the suspected criminal at the store, and it can also include video or photograph footage of the previous crime (e.g., from any participating retailer with the security system). The system can store the video or photograph information so that it can later be used for reporting. A centralized private database of face information from multiple stores can be used.

Figure 11:
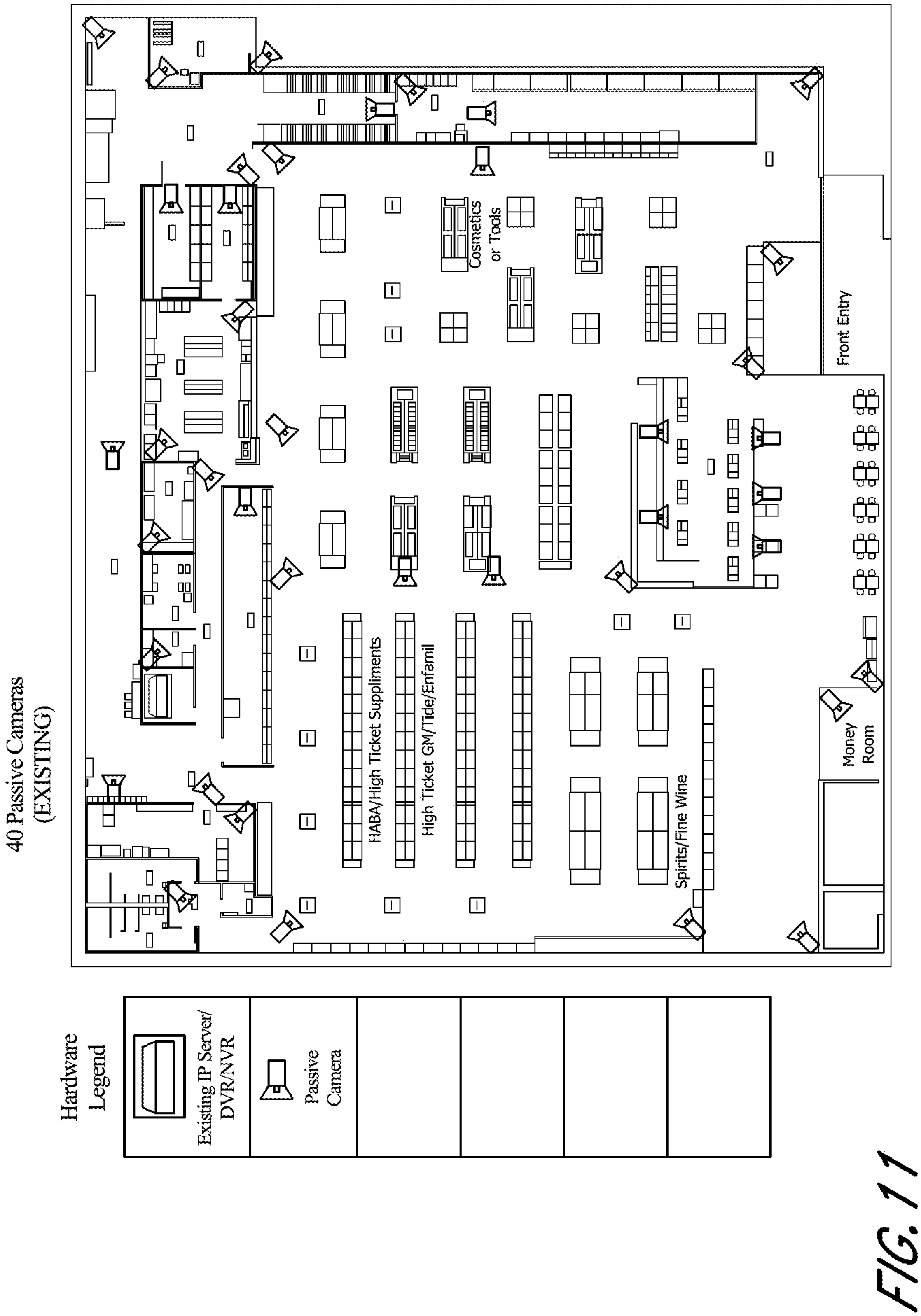
FIG. 11 schematically shows an example embodiment of a physical structure or building (e.g., a store) having a passive camera system.
Figure 12:
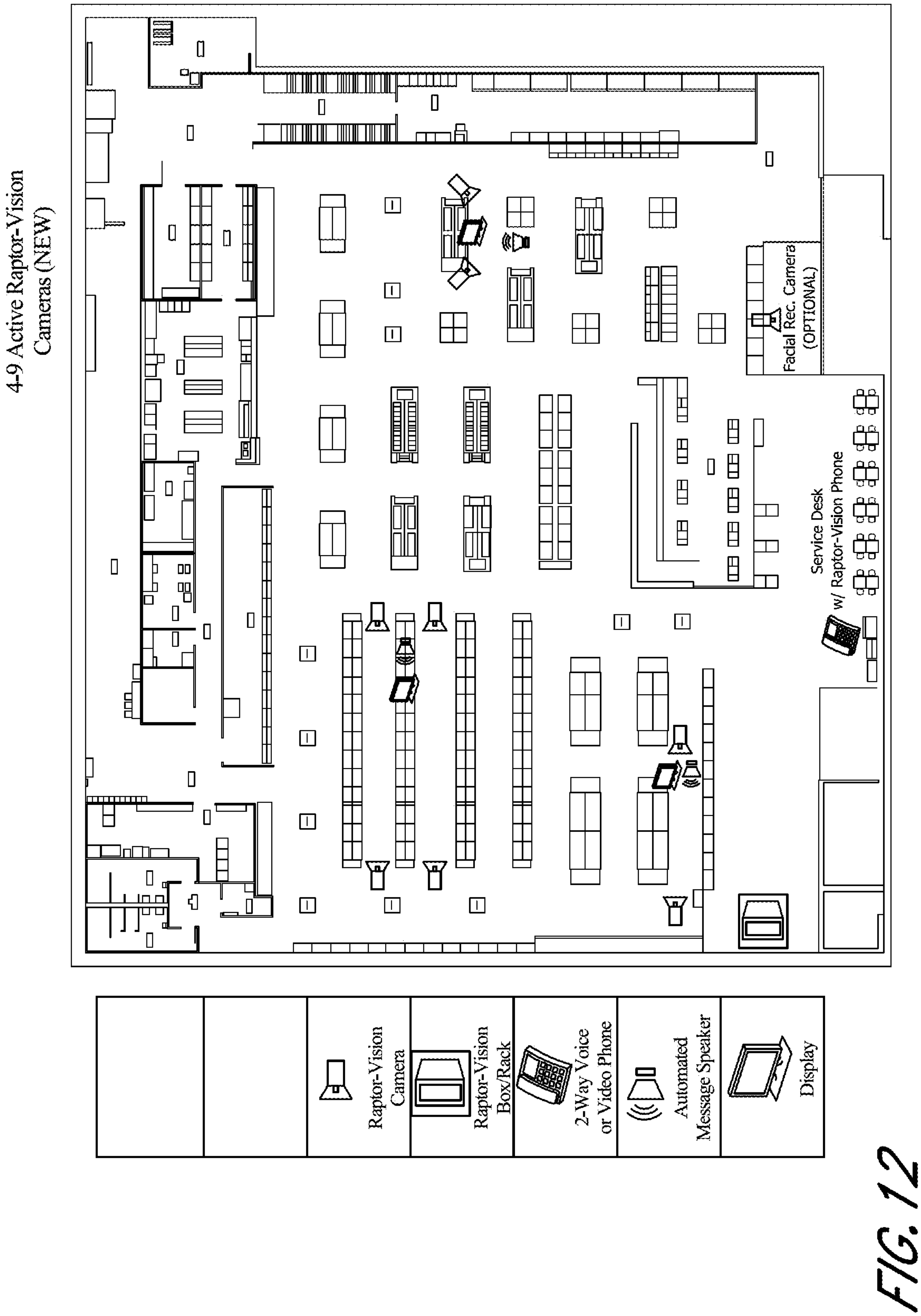
FIG. 12 schematically shows an example embodiment of a physical structure or building (e.g., a store) having a system (e.g., an active camera system) for detecting and/or deterring crime.
Figure 13:
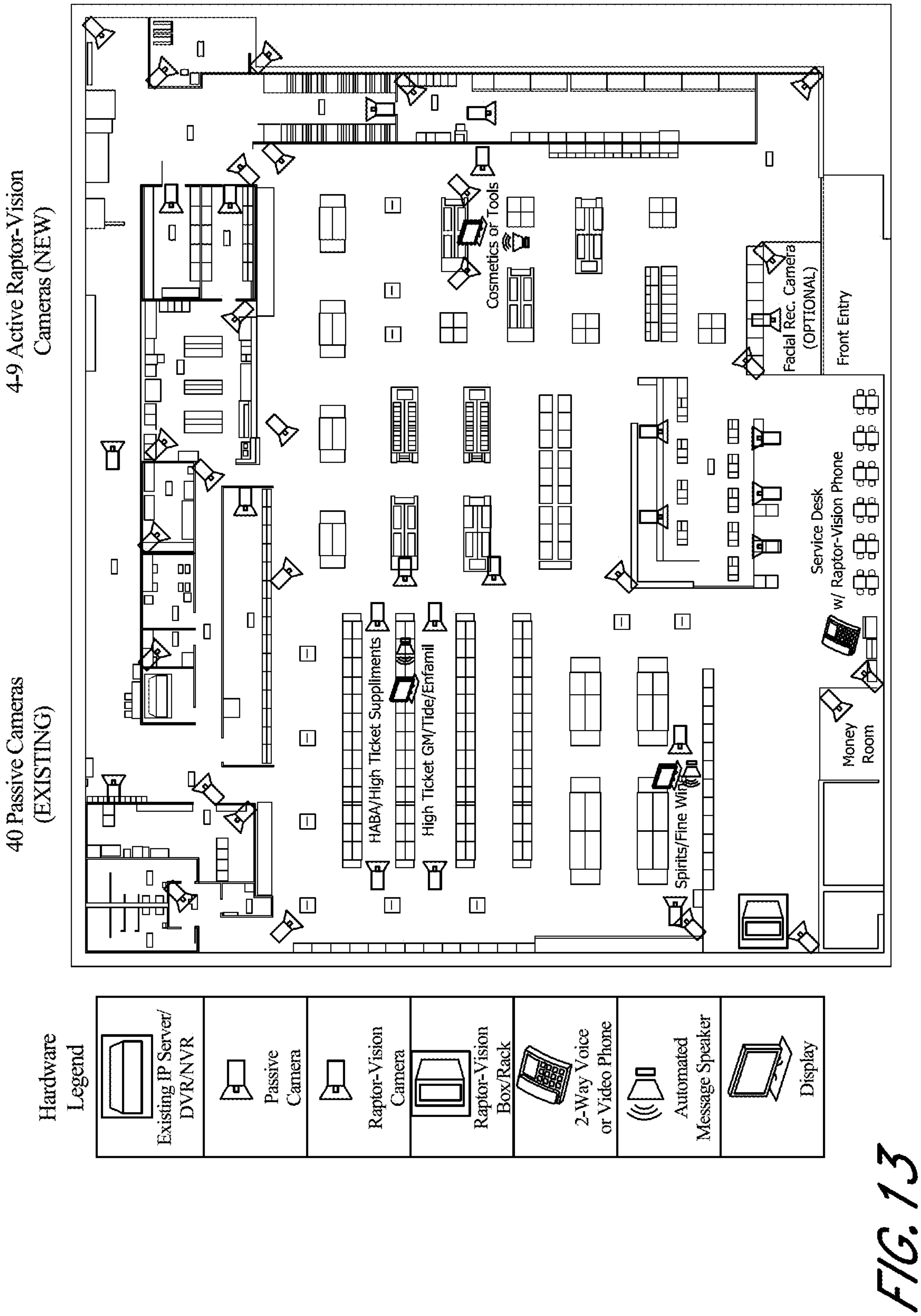
FIG. 13 schematically shows an example embodiment of a physical structure or building (e.g., a store) having the systems of FIGS. 12 and 13 implemented independent from each other.

In some embodiments, the security system can be isolated from the existing company network, security systems, and other store systems. Because the security system of this embodiment does not have access to the company network or any other systems, it does not pose a cyber security risk to the store. If a hacker were to compromise the security system of this embodiment, the hacker would not gain access to the company network or any other system of the store. FIG. 11 shows an example embodiment of a store having a system that includes 40 passive cameras that communicate with an IP server/DVR/NVR or the like. As shown in FIGS. 13, the security system disclosed herein can be installed in the same store, in addition to the system of FIG. 11 (e.g., as a separate layer of defense). The security system can be independent of the system of FIG. 11, and independent of any other system of the store, as discussed herein. As shown in FIG. 12, the system can be installed in a store that does not include the system of FIG. 11. Many alternatives are possible. For example, the systems disclosed herein can be integrated with other store systems, in some instances. For example, in some embodiments, the system can use the existing cameras of the system of FIG. 11. Although many embodiments are discussed as using a plurality of cameras, a single camera can be used in some implementations.

With reference to FIGS. 12 and 13, the system can include video cameras, which can be positioned at locations to monitor target areas within the store, such as areas that have high-value merchandise. The system can include a controller (e.g., an alarm controller), such as a box or rack, that includes one or more computer processors and non-transient computer readable memory in communication with the one or more computer processors. The controller can perform the functions and operations discussed herein. The controller can perform video analytics, such as to identify a theft event, as discussed herein. The system can include one or more cameras positioned and/or configured for facial recognition. The controller can contain or access the database of face information and perform the face recognition operations discussed herein. In some instances the controller can be in communication with a central security center or other remote system (e.g., a dispatch system, using a network), which can perform the video analytic functions, the theft event determinations, or other functions described herein. The controller can include an alarm panel or communicate with an alarm panel, which can send alarm signals to an alarm system in the retail store, a central station, and/or to law enforcement.

The system can include one or more terminals, such as a 2-way voice or video phone. The terminal can be used to provide input to the system (e.g., cancel a detected theft event, or activate a message or alarm, or modify system settings). The terminal can be used to communication with the central security center or law enforcement. The terminal can be used to provide a message to or converse with the suspected criminal(s), to converse with shoppers in the target area, to view video footage or images relating to the detected theft event, to listen to audio relating to the detected theft event. In some embodiments, the system can include microphones at the target areas to record or transmit audio (e.g., to the terminal and/or to the controller). In some embodiments, the cameras can include integrated microphones. In some cases the system can use the microphones for communication (e.g., like an intercom) during a triggered theft event. In some cases the system does not record or store audio information from the microphones. The system can include one or more speakers, which can be used to provide messages to, or to converse with, suspected criminals or shoppers in the target area. The system can include one or more displays, which can be used for displaying messages, images, or video to suspected criminals, such as two-way video/audio communication. The display (s) and/or speaker(s) can be used to provide advertisement information when no theft event is identified, as discussed herein. The controller can include a media server, which can stream out independently controlled advertising. A media server can provide advertisements for two or more (e.g., several) different aisles with different target products, for example. The speaker(s) can be integrated into the display(s) in some cases. Accordingly, the system can enable store personnel to safely engage a suspected criminal, and can also enable store personnel to make a proactive customer service interaction with a shopper when appropriate. Communication can be audio only, in some embodiments. In some embodiments, a camera can be located at or incorporated into the terminal, to enable video communication from the terminal.

The system can be used to detect a potential crime, notify of a crime in progress, and/or deter a crime. The system can provide local interaction with a customer or a suspected criminal together with simultaneous remote dispatch response.

While certain embodiments are described herein with respect to theft events, this is not meant to be limiting. For example, the techniques described herein as being implemented by the system can be used to detect and/or deter theft events (e.g., stealing an item from a specified area in a retail store, from a specified area in a distribution center, from a specified area in a manufacturing facility, from a specified area in a storage facility, from a specified area in a pharmacy, etc.), to detect and/or deter any criminal activity other than theft (e.g., tagging or applying graffiti to a wall, cutting wires in a fence, breaking down or attempting to forcibly enter a door, cutting or otherwise circumventing locks, or any other activity in which multiple intrusions are performed, such as quick lateral motions (e.g., the back and forth movement of a hand, arm, leg, head, etc.) at a single location or within a defined area that may be made by a perpetrator in performing the crime), and/or to detect the selection of items (and/or the number of such selections) from a counter, cabinet, shelf, rack, safe, secure area, etc. (e.g., to track item inventory, to determine whether the number of item selections matches or closely matches the number of item purchases, to determine whether an item, such as a toxic, volatile, valuable, or controlled substance, has been accessed more than an allowed number of times, etc.).

System Diagram

Figure 14:
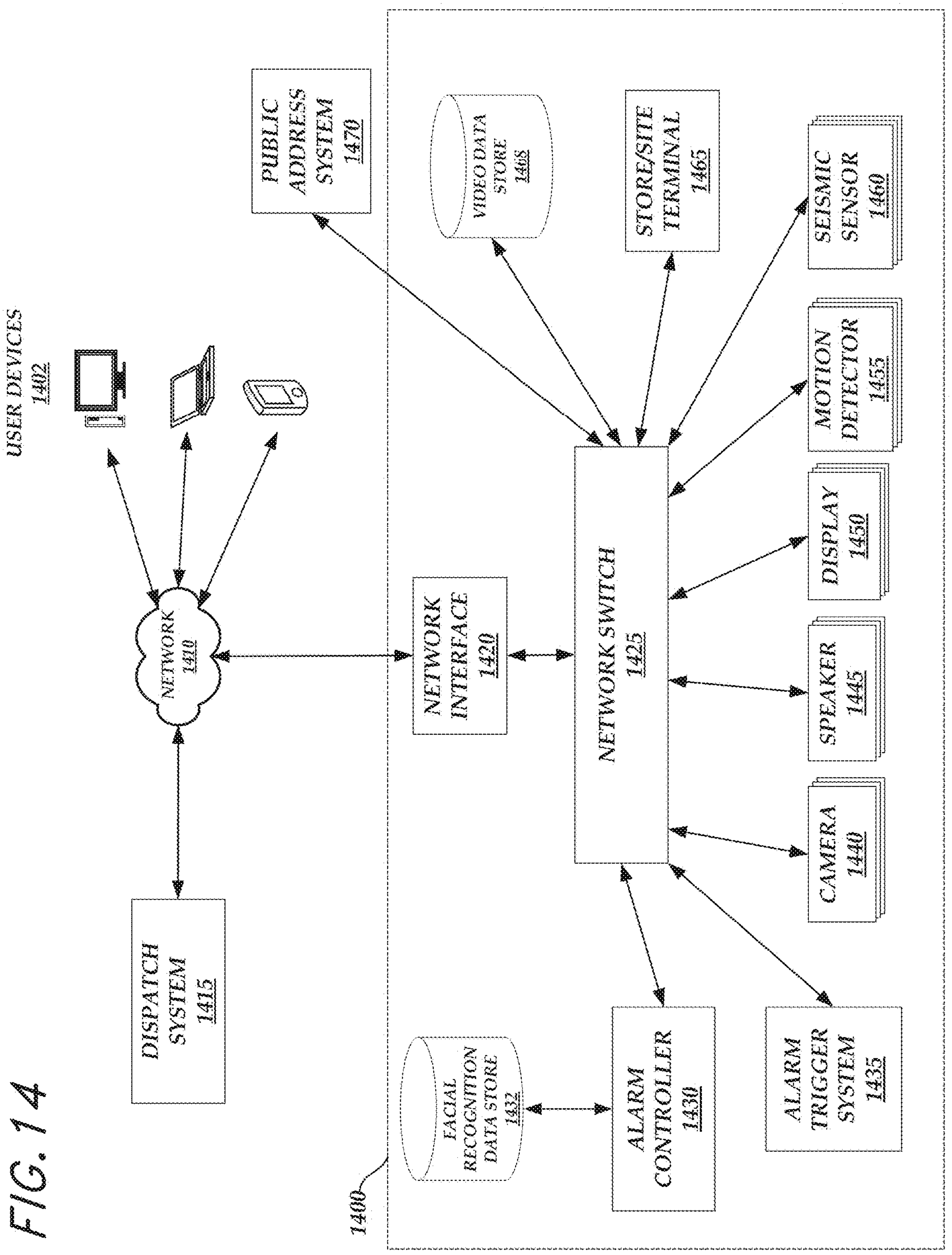
FIG. 14 schematically shows a block diagram depicting components of an example embodiment of a system.

FIG. 14 schematically shows a block diagram depicting components of an example embodiment of a system 1400. The system 1400 may be located in a building, such as a retail store. As illustrated in FIG. 14, the system 1400 includes a network interface 1420, a network switch 1425, an alarm controller 1430, a facial recognition data store 1432, an alarm trigger system 1435, one or more cameras 1440, one or more speakers 1445, one or more displays 1450, one or more motion detectors 1455, one or more seismic sensors 1460, a store/site terminal 1465, and/or a video data store 1468.

The network interface 1420 can be any physical computing device configured to communicate with a network, such as network 1410. For example, the network interface 1420 can be a physical computing device configured to provide a wireless area network (WAN), such as a cellular hotspot, a router, an optical network terminal, etc. The network interface 1420 can serve as an interface between the network 1410 and the network switch 1425. A dispatch system 1415 and various user devices 1402 may be external (or internal) to the building in which the system 1400 is located and may be in communication with the network 1410. The components of the system 1400 can therefore communicate with the dispatch system 1415 and/or the user device(s) 1402 via the network interface 1420 and network 1410. The dispatch system 1415 can include a physical computing system operated by a remote monitoring station, which can be a centralized monitoring station that monitors a plurality of locations having the system 1400. The monitoring station can interface with law enforcement in response to a theft event, such as to send law enforcement to the site of the system 1400. In some cases the dispatch system 1415 can include a system operated by law enforcement that receives information about potential crimes and allows dispatchers to dispatch law enforcement accordingly).

In some embodiments, the network 1410 includes any wired network, wireless network, or combination thereof. For example, the network 1410 may be a personal area network, local area network, wide area network, over-the-air broadcast network (e.g., for radio or television), cable network, satellite network, cellular telephone network, or combination thereof. As a further example, the network 1410 may be a publicly accessible network of linked networks, possibly operated by various distinct parties, such as the Internet. In some embodiments, the network 110 may be a private or semi-private network, such as a corporate or university intranet. The network 1410 may include one or more wireless networks, such as a Global System for Mobile Communications (GSM) network, a Code Division Multiple Access (CDMA) network, a Long Term Evolution (LTE) network, or any other type of wireless network. The network 1410 can use protocols and components for communicating via the Internet or any of the other aforementioned types of networks. For example, the protocols used by the network 1410 may include Hypertext Transfer Protocol (HTTP), HTTP Secure (HTTPS), Message Queue Telemetry Transport (MQTT), Constrained Application Protocol (CoAP), and the like. Any suitable protocols and components for communicating via the Internet or any of the other aforementioned types of communication networks can be used.

The alarm controller 1430, the alarm trigger system 1435, the camera(s) 1440, the speaker(s) 1445, the display(s) 1450, the motion detector(s) 1455, the seismic sensor(s) 1460, the terminal 1465, and/or the video data store 1468 can be in communication with each other (e.g., via the network switch 1425). For example, some or all of the alarm controller 1430, the alarm trigger system 1435, the camera(s) 1440, the speaker(s) 1445, the display(s) 1450, the motion detector(s) 1455, the seismic sensor(s) 1460, the terminal 1465, and/or the video data store 1468 are coupled to each other and/or to the the network switch 1425 via a wired connection (e.g., an Ethernet cable). Alternatively or in addition, some or all of the alarm controller 1430, the alarm trigger system 1435, the camera(s) 1440, the speaker(s) 1445, the display(s) 1450, the motion detector(s) 1455, the seismic sensor(s) 1460, the terminal 1465, and/or the video data store 1468 are in communication with each other and/or the network switch 1425 via a wireless connection (e.g., via BLUETOOTH, WIFI, etc.). In addition, PA system 1470, which may be located in the same building as the system 1400, may be in communication with the network switch 1425 via a wired or wireless connection. The PA system can be triggered and/or controlled by the alarm controller 1430, such as to broadcast a message to at least the monitored area. It will be understood that in some embodiments, various components of the system 1400 can communicate directly with each other, without going through the network switch. In some embodiments, the network switch 1425 can be omitted, or multiple network switches, hubs, or other communication components can be used to facilitate communication between the components of the system to implement the functionality discussed herein.

The network switch 1425 may receive AC power from a main power line accessible via the building. The network switch 1425 can then route power to one or more of the other components of the system 1400 via a cable, such as an Ethernet cable (e.g., power over Ethernet (POE) can be used to route power from the network switch 1425 to the other components of the system 1400). Alternatively, the alarm controller 1430 and/or alarm trigger system 1435 receive AC power in addition to or instead of the network switch 1425, and the alarm controller 1430 and/or alarm trigger system 1435 routes power to the other components of the system 1400 via the network switch 1425 and POE.

As described herein, the camera(s) 1440, the speaker(s) 1445, the display(s) 1450, the motion detector(s) 1455, and/or the seismic sensor(s) 1460 may be located in various locations within the building. The camera(s) 1440, the speaker(s) 1445, the display(s) 1450, the motion detector(s) 1455, and/or the seismic sensor(s) 1460 may each be associated with a zone or area corresponding to the location within the building in which the respective component is located.

Data received from the camera(s) 1440, the motion detector(s) 1455, and/or the seismic sensor(s) 1460 can be routed (e.g., by the network switch 1425, other communication components, direct wired connections, or wireless signals) to the alarm controller 1430, which can be located within the system 1400 (as shown) or external to the system 1400 (e.g., in the building, but external to the system 1400, external to the building, etc., not shown). The alarm controller 1430 can process images and/or videos received from the camera(s) 1440 and/or indications of movement or shaking received from the motion detector(s) 1455 and/or seismic sensor(s) 1460 to determine whether a potential theft event is detected. Additional details regarding the operations performed by the alarm controller 1430 to determine whether a potential theft event is detected are described in greater detail below. The alarm controller 1430 can be an alarm monitoring video server or any video server. The alarm controller 1430 can also simply be referred to as a controller. The alarm controller 1430 can be a general computer system running software to implement the functionality described herein, or can be a dedicated computing hardware system designed to implement the functionality described herein.

If the alarm controller 1430 determines that a potential theft event is detected, then the alarm controller 1430 may transmit a message to the alarm trigger system 1435 (e.g., via the network switch 1425). The message may include an indication of a time that the potential theft event is detected and an indication of a zone or area within the building in which the potential theft event is detected. The alarm trigger system 1435 can include an alarm panel. In some the alarm controller 1430 can send the message to an existing alarm panel at the store/site, which also handles other alarm types (e.g., break in, robbery, burglary, etc.). In some embodiments, the alarm trigger system 1435 can include an alarm panel that is dedicated to the system 1400. The alarm trigger system can include a user interface, such as having a display, buttons, or other user input elements or information output elements. The alarm system can be in communication with a network interface 1420 so that it can communicate alarms to outside entities (e.g., the dispatch system 1415), such as in response to the message from the alarm controller 1430 indicating a potential theft event. In some cases the alarm trigger system 1435 can have its own dedicated network interface (e.g., a cellular network interface).

In response to the potential theft event, the alarm controller 1430 and/or the alarm trigger system 1435 can cause one or more of the components to take automated action(s). One or more speaker(s) 1445 can play an automated message. The automated message can be designed to deter theft, while not being accusatory (e.g., "Sales associates are coming to isle 6 immediately to assist you."). In response to the potential theft event, the alarm controller 1430 and/or the alarm trigger system 1435 can cause the establishment of a communication link between the camera 1440 (e.g., that captured the video/images that triggered the potential theft event) and the terminal 1465. By way of example, the alarm trigger system 1435, which may be located within an alarm panel in the building, can transmit a signal to the camera 1440 in the building that is associated with the zone or area within the building in which the potential theft is detected via the network switch 1425. The signal, when received by the camera 1440, can cause the camera 1440 to call the terminal 1465.

As described herein, when a manager, security personnel, or other employee answers the call, the terminal 1465 can present images, video, and/or audio information captured by the camera 1440 or other devices associated with the area of interest. For example, live video and/or sound of the zone or area in which a potential theft event is detected can be provided by the camera 1440 to the terminal 1465, which can enable the store personnel to view the current actions of the suspect(s). In some implementations, past video and/or audio of the zone or area in which a potential theft event is detected can also be stored, made accessible via the alarm controller 1430, and/or optionally provided to the terminal 1465, such as the video and/or audio captured around the time of the event(s) that triggered the theft event determination. For example, video and/or audio captured by the camera(s) 1440 can be stored by the camera(s) 1440 in the video data store 1468 (e.g., transmitted via the network switch 1425). The video and/or audio data can be stored in the video data store 1468 in entries associated with the time that the respective video and/or audio is captured and with an indication of the camera 1440 that captured the respective video and/or audio. If a potential theft event is determined to have occurred at a first time (e.g., 3:05:46) in a first zone or area, the alarm controller 1430 or the alarm trigger system 1435 can retrieve from the video data store 1468 (e.g., stored locally or on a server) the video and/or audio captured around the first time (e.g., from 3:05:41 to 3:05:51) by the camera 1440 located in the first zone or area. The alarm controller 1430 or alarm trigger system 1435 can then store that video and/or audio differently so that it will not be deleted automatically, or can flag the video and/or audio as being associated with the potential theft event. The user can retrieve the video and/or audio information, such as using the alarm controller 1430 or other user device associated with the system. The video and/or audio can optionally be transmitted to a user device 1402 (e.g., via an email or text), to a dispatch system 1415, and/or to the store/site terminal 1465.

When no potential theft event is identified, the system can store (e.g., in the video data store 1468) a rolling window of video footage and/or images received from the camera(s) 1440 and/or audio information. After an amount of time has passed (e.g., 5 seconds, 10 seconds, 30 seconds, 1 minute, 5 minutes, 15 minutes, 1 hour, 3 hours, 12 hours, 24 hours, or more, or any range of times bounded by these values), video footage and/or images and/or audio can be deleted or replaced. When a potential theft event occurs the system can save footage/images/audio associated with the potential theft event, so that it is not deleted or replaced. The saved footage/images can be used to enable a user to determine whether a theft is actually happening, to identify the thief, etc.

Alternatively or in addition, the alarm controller 1430 or alarm trigger system 1435 can transmit the retrieved video and/or audio to the dispatch system 1415 (e.g., a centralized monitoring station or to law enforcement) via the network switch 1425, the network interface 1420, and the network 1410 and/or to one or more user devices 1402 via the network switch 1425, the network interface 1420, and the network 1410. In some cases, information can be transmitted over multiple networks at once. For example, the video and/or audio can be transmitted to the user device 1402 as part of a text message, as an attachment in an email (e.g., where the email and attachment(s) are transmitted to an email server accessible by the user device 1402), and/or as standalone file(s).

The manager, security personnel, or other employee (e.g., user) can use the terminal 1465 to communicate with the suspects. For example, the terminal 1465 can include a camera and/or microphone used to capture video and/or audio of the user. The terminal 1465 can be a telephone, a video telephone, or other suitable communication device. The terminal 1465 can be a telephone (e.g., a video telephone) that is dedicated to communication with the system 1400 (e.g., not capable of receive or making outside phone calls). In some cases, the terminal 1465 can be part of a normal phone system, so that the terminal can be used to make and receive normal phone calls, as well as to interface with the system 1400, as described herein. In some cases the system 1400 can have multiple terminals 1465, such as positioned at different locations in the store (e.g., one terminal at a security station, one terminal at a customer service station, one terminal at a manager's office, and/or one terminal at a front desk). The terminal 1465 can be a stationary terminal, such as a phone that is wired to a communication port. The terminal 1465 can be a mobile communication device, such as a smartphone or tablet computer, etc. The terminal 1465 can communicate with other components of the system 1400 through a wireless protocol (e.g., WIFI, a cellular network, BLUETOOTH, etc.) or through a wired connection (e.g., through the network switch 1425).

The user can actuate an input element (e.g., a button, a touch screen, a voice command, etc.) of the terminal 1465 to engage a communication link between the terminal 1465 and the camera 1440, speaker 1445, and/or display 1450 located in the zone or area in which the potential theft event is detected a communication device. As described above, the user can actuate the input element and provide an audio message to the suspect(s) via the camera 1440 (e.g., if the camera 1440 includes a speaker) or the speaker 1445. The terminal 1465 and the camera 1440 can be configured to provide two-way voice communications such that the user can converse with the suspect(s). Further as described above, the alarm trigger system 1435 and/or the terminal 1465 can transmit an instruction to the display 1450 via the network switch 1425 to display an image or video to the suspect(s) (e.g., a video of the user as captured by the terminal 1465). In some embodiments, the terminal 1465 can include a user input element configured to enable the user to indicate that a theft event is happening. The user input element can be a panic button. In response to input received from the user input element (e.g., panic button), the system can contact the dispatch system 1415, send a message to the monitored area such as using the speaker(s) 1445 and/or the PA system 1470, or take other remedial action as discussed herein.

The user can also use the terminal 1465 to trigger an alarm or to identify a false positive. For example, the user can select an input element that, when selected, causes the terminal 1465 to transmit a message to the alarm trigger system 1435, which can cause the alarm trigger system 1435 to take an action responsive to the indication of a theft event, such as triggering or activating a silent or audible alarm in the building (e.g., via the PA system 1470), in the target zone or area of the building (e.g., via the PA system 1470), and/or with an external system (e.g., a remote monitoring station and/or a law enforcement alarm system). As another example, the user may determine that a theft event is not occurring. The user can select an input element indicating that the detection is a false positive (which may cause the alarm trigger system 1435 to not trigger an alarm, to stop any alarm that may be playing, and/or to send an all clear indication to an external system such as the dispatch system 1415, or the like). If no input is provided by the user to the terminal 1465 within a threshold amount of time (e.g., 10 seconds) from when the call to the terminal 1465 is answered, then the terminal 1465 can notify the alarm trigger system 1435 accordingly. The alarm trigger system 1435 can then transmit an automated message to the speaker 1445 and/or the PA system 1470 speaker, transmit an instruction to the display 1450 to display an image or video (e.g., a message indicating to the suspect that help is on the way), transmit a message to the dispatch system 1415 that a potential theft event is occurring, and/or transmit a message to the user device 1402 (e.g., a snapshot of the potential theft event, video of the potential theft event, audio of the potential theft event, etc.). Thus, if store personnel do not provide any indication of whether a potential theft event is happening (and such confirmation is required by the system 1400), the system 1400 can still perform a default responsive action.

If a user does not answer the call initiated by the camera 1440, the camera 1440 may inform the alarm trigger system 1435 via the network switch 1425 accordingly. In response, the alarm trigger system 1435 can initiate a call with or transmit a message to the dispatch system 1415 such as via the network switch 1425, the network interface 1420, and the network 1410. The call, when answered, may result in a dispatcher using the dispatch system 1415 to hear an automated message that provides information on the potential theft event, such as the time and location (e.g., building and zone in building) of the potential theft event. Similarly, the transmitted message can include the same potential theft event information. As described herein, the alarm trigger system 1435 can further retrieve video and/or audio of the potential theft event (e.g., based on matching a timestamp of a time when a potential theft event is detected to timestamp(s) of images, video, and/or audio) from the video data store 1468 and transmit the video and/or audio to the dispatch system 1415. The alarm trigger system 1435 can further trigger an audible alarm via the PA system 1470 and/or via the one or more speakers 1445. Thus, if store personnel are not available at the terminal 1465 when the theft event is identified, the system 1400 can still perform a default responsive action. In further embodiments, the alarm trigger system 1435 transmits the potential theft event information and/or the video and/or audio to the dispatch system 1415 simultaneously with transmitting the signal to the camera 1440 and/or regardless of whether a user answers the terminal 1465. In some embodiments, the system 1400 can take automated actions without waiting for user input (e.g., from the terminal 1465). For example, the speaker(s) 1445 can play an automated message. The system can have a plurality of stored automated messages, and the alarm controller 1430 can determine which automated message to use based on the parameters that triggered the potential theft event (e.g., where is the potential theft event, how many people involved, whether other shoppers are present, a determined score indicating how confident the system is that a true theft event is occurring, etc.) Additional messages (which can be different than an initial message) can be provided later, such as once input is received via the terminal 1465. By way of example, the process can start (e.g., without waiting for user response) with an automated initial message that is relatively not threatening, and can escalate to a more direct or accusatory message (e.g., if the user confirms the theft event via the terminal).

In alternate embodiments, not shown, the terminal 1465 is located off-site at a location remote from the store or building. For example, a centralized monitoring station or service company can be used to monitor multiple stores and have access to the network 1410. The components of the system 1400 can then communicate with the terminal 1465 via the network switch 1425, the network interface 1420, and the network 1410.

In some embodiments, in response to receiving the message from the alarm controller 1430 of a potential theft event, the alarm trigger system 1435 transmits an automated message to the speaker 1445 in the building that is associated with the zone or area within the building in which the potential theft event is detected via the network switch 1425 and/or to a speaker of the PA system 1470 that is associated with at least the zone or area within the building in which the potential theft event is detected. Reception of the automated message may cause the speaker 1445 or the PA system 1470 speaker to output audio corresponding to the automated message. For example, the speaker 1445 or the PA system 1470 can broadcast a message like the following: "All associates to the liquor isle. All associates to the liquor isle immediately."

The alarm panel that includes the alarm trigger system 1435 and/or the enclosure that houses the alarm controller 1430 may itself be secured with an alarm. If the alarm panel or enclosure is tampered with (e.g., opened, or opened without a proper code being supplied to disable the alarm), the alarm coupled to the alarm panel or enclosure can notify the alarm trigger system 1435 that an alarm should be triggered. In response, the alarm trigger system 1435 and/or alarm controller 1430 can cause the speaker(s) 1445 and/or the PA system 1470 speaker(s) to output an audible alarm, transmit an instruction to a display 1450 to display an image or video (e.g., a message informing store personnel that the alarm panel or enclosure is being tampered with, video of a room in which the alarm panel or enclosure is located, etc.), transmit a message to the dispatch system 1415 that a potential theft event is occurring or will occur, and/or transmit a message to the user device 1402 (e.g., indicating that the alarm panel or enclosure is being tampered with). Thus, the alarm controller 1430 and/or alarm trigger system 1435 can be secured from unauthorized access that may affect the triggering of alarms and/or messages.

As described above, the alarm controller 1430 and/or the alarm trigger system 1435 can receive AC power from a main power line accessible via the building. The alarm controller 1430 and/or alarm trigger system 1435 may further include a battery back-up. If the alarm controller 1430 detects that the type of power received has transitioned from AC to DC (e.g., indicating that AC power has been lost and the battery back-up is now supplying power to the alarm controller 1430), then the alarm controller 1430 can instruct the alarm trigger system 1435 to trigger an alarm, transmit an alert to the user device 1402, transmit an alert to the dispatch system 1415, etc. Similarly, if the alarm trigger system 1435 detects that the type of power received has transitioned from AC to DC (e.g., indicating that AC power has been lost and the battery back-up is now supplying power to the alarm trigger system 1435), then the alarm trigger system 1435 can trigger an alarm, transmit an alert to the user device 1402, transmit an alert to the dispatch system 1415, etc.

The camera(s) 1440 can be hemispheric cameras, infrared cameras, thermal imaging cameras, high-resolution cameras, and/or the like. The camera(s) 1440 may include microphones and/or speakers such that two-way audio features can be provided (e.g., two-way with the terminal 1465). The camera(s) 1440 may further include a display such that two-way video features can be provided (e.g., two-way with the terminal 1465).

The cameras 1440 can be positioned such that one or more shelves are visible. For example, each camera 1440 can be positioned above an aisle (e.g., within a vertical plane extending up from the aisle) and a lens of the camera 1440 can face downward toward the aisle. The camera(s) 1440 can be positioned at any point above an aisle. For example, an aisle may be the area in front of a single shelf (and optionally surrounded on the opposite side by a wall or other structure) or the area between two or more shelves. If the aisle is the area in front of a single shelf, then the camera 1440 may be positioned at any point above the aisle between the shelf and the wall or other structure that defines the boundary of the aisle opposite from the shelf. If the aisle is an area between two or more shelves (e.g., two or more shelves define the boundary of the aisle), then the camera 1440 may be positioned at any point above the aisle between the shelves that border the aisle. In addition, the cameras 1440 may be positioned such that obstructions are minimized. For example, the cameras 1440 may be positioned such that the area between the camera lens and shelves and/or aisles include as few objects as possible such that a user can see and define a mask that fully or almost fully covers a portion of a shelf, aisle, etc. and/or that does not cover other objects, such as beams, rods, shadows over shelves and/or aisles caused by other objects, etc.

As described above, the display(s) 1450 can have a first operating mode when no theft event is detected. For example, the display(s) 1450 can be used to display advertising information, such as specifically related to the high-value merchandise in the associated zone or area. When a theft event is detected, the alarm trigger system 1435 can cause the display 1450 associated with the zone or area in which the theft event is detected to transition from the first operating mode to a second operating mode to display an image or video configured to deter theft (e.g., an automated message indicating help is on the way, an alert like a flashing red screen, a live video of the user of the terminal 1465, etc.). The other display(s) 1450 may remain in the first operating mode unless, for example, the alarm trigger system 1435 specifically instructs such display(s) 1450 to transition to the second operation mode either via direct messages transmitted through the network switch 1425 or via a broadcast message directed at all display(s) 1450.

The motion detector(s) 1455 can be passive infrared (PIR) motion detectors configured to detect motion of an object (e.g., a human) in a surrounding environment, where the motion detector(s) 1455 are not necessarily coupled to the object. Signals generated by a motion detector 1455 (e.g., indicating detected motion) are transmitted to the alarm controller 1430 via the network switch 1425. The sensitivity of the motion detector(s) 1455 can be set when the motion detector(s) 1455 are installed or while the motion detector(s) 1455 are in use. For example, the alarm controller 1430 can adjust the sensitivity of the motion detector(s) 1455, via the network switch 1425, based on user inputs.

Furthermore, as described above, the seismic sensor(s) 1460 can be physical devices configured to detect low or high amplitude vibrations (e.g., seismometers). The seismic sensor(s) 1460 can be placed on shelves, racks, cabinet doors, items, and/or the like to detect vibrations in the components on which the seismic sensor(s) 1460 are placed. Signals generated by a seismic sensor 1460 (e.g., indicating detected vibrations) are transmitted to the alarm controller 1430 via the network switch 1425.

Various example user devices 1402 are shown in FIG. 14, including a desktop computer, laptop, and a mobile phone, each provided by way of illustration. In general, the user devices 1402 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like.

While FIG. 14 depicts the system 1400 as including the alarm controller 1430, the facial recognition data store 1432, the alarm trigger system 1435, the camera(s) 1440, the speaker(s) 1445, the display(s) 1450, the motion detector(s) 1455, the seismic sensor(s) 1460, the terminal 1465, and the video data store 1468, this is not meant to be limiting. For example, any one or more of these components can be removed from the system 1400 and/or located external to the system 1400. In addition, other security-related components, not shown, can be included within the system 1400. Various components of the system 1400 can be combined into a single element. For example, a single storage device can provide the video data store 1468, the facial recognition data store 1432, and other information (e.g., machine executable instructions for implementing the features discussed herein). An integrated device can include the camera 1440 and speaker 1445. A single computing system can implement the alarm controller 1430 and the alarm trigger system 1435, as well as other element of the system 1400. Elements described as being part of the system 1400 can be remove to the area being monitored. For example, a facial recognition data store 1432 can be located on a remote server, which the system 1400 can access, such as via the network 1410. Furthermore, while the present disclosure describes the system 1400 as monitoring locations within a building or store, this is not meant to be limiting. The system 1400 can be implemented inside or outside to detect potential theft events in an indoor or outdoor environment. Various features show of the system 1400 are optional and can be omitted. For example, the motion detector 1455 and seismic sensor 1460 can be optional features. In some implementations, not store/site terminal 1465 is used. The system can detect a potential theft event and provide an automated message via the speaker 1445 or PA system 1470, or display 1450. In some cases, the speaker 1445 and/or the PA system 1470 can be omitted. A message can be provided to the area that is being monitored using the display 1450 with or without an audio component. In some cases, the alarm trigger system 1435 can be omitted, and in some embodiments, the system does not have connection to outside systems (e.g., dispatch system 1415 or user devices 1402) via the network 1410. In some cases, the facial recognition data store 1432 and associated functionality can be omitted. Components of the system 1400 can communication with each other without the network switch 1425. In some cases, the video data is not stored, and the video data store 1468 can be omitted. Many variations are possible.

In further embodiments, the system 1400, or systems similar thereto, can simultaneously serve one or more purposes. For example, the system 1400 can be used to detect a theft event as described herein. Alternatively or in addition, the system 1400, or a system similar thereto, can be used for inventory management purposes. As an illustrative example, the system 1400 (e.g., the alarm controller 1430) can use the techniques described herein (e.g., to detect breaches) to determine the number of times an item has been retrieved from a counter, shelf, cabinet, rack, safe, box, etc. For example, if ten breaches are detected, the system 1400 may determine that ten of the items have been retrieved from a particular location. The system 1400 can then perform one or more additional actions once the number of times an item has been retrieved is determined. For example, the system 1400 can be configured to monitor a retail store or a distribution center. The system 1400 (e.g., the alarm controller 1430) can detect that a certain number of items have been retrieved. The system 1400 can update an inventory database to reflect the number of items remaining at the retail store or the distribution center after the detected number of items have been retrieved. Alternatively or in addition, detection of the retrieval of items may indicate that the retail store or distribution center is running low on that particular item. Thus, the system 1400 (e.g., the alarm controller 1430 or an inventory management device, not shown) can manage inventory by automatically ordering additional items, causing the shipment of additional items to the retail store or distribution center, transmitting an instruction to a delivery vehicle to re-route items being carried by the delivery vehicle to the retail store or distribution center, etc. to replenish the items that have been retrieved from the retail store or distribution center. The location of the detected breaches can be correlated to specific items (e.g., based on the positions of items on the shelves).

As another example, the system can manage inventory as described in the example above. In addition or alternatively, the system can detect possible crime if certain conditions are present and take appropriate action. For example, if the number of breaches detected in a defined area and within a certain timeframe are greater than a threshold value, this may indicate that a person is attempting to steal an item rather than attempting to retrieve an item for purchase and/or to give to a customer. Thus, the system (e.g., the alarm controller 1430 or an inventory management device, not shown) can manage inventory, selectively instructing the alarm trigger system 1435 to take any of the action described herein if the volume and/or frequency of breaches exceeds a threshold.

As another example, the system can obtain an invoice or sales data indicating the number of items that have been ordered prior to any detected breaches. If the system (e.g., the alarm controller 1430) determines that the number of items that have been ordered does not correlate with the number of breaches that are subsequently detected with respect to a particular item (e.g., the number of items that have been ordered is a threshold value less than the number of detected breaches), then this may indicate possible theft or other criminal activity (e.g., more items have been retrieved than are needed to fulfill the orders). Thus, the alarm controller 1430 can then instruct the alarm trigger system 1435 to take any of the actions described herein. The system can be used in a distribution center, to confirm that orders are correctly fulfilled. If the number of breaches (e.g., within a timeframe) is less than or higher than a number of expected breaches based on an order, then the system can indicate that a crime event or malfunction may have occurred (e.g., using an alarm, notification, etc.).

As another example, the system can detect the number of breaches corresponding to a particular item as described herein (e.g., in a retail store or other suitable location). The system can then obtain sales data indicating the number of these items that have been purchased subsequent to any detected breaches (e.g., where the sales data can be obtained at any time frame, such as at the end of the work day, within an hour of a detected breach, within 2 hours of a detected breach, etc.). If the system 1400 (e.g., the alarm controller 1430) determines that the number of items that have been purchased does not correlate with the number of breaches that were detected with respect to a particular item prior to the purchases of those items (e.g., the number of items that have been ordered is a threshold value less than the number of detected breaches), then this may indicate possible theft or other criminal activity (e.g., more items have been retrieved than were purchased). Thus, the alarm controller 1430 can then instruct the alarm trigger system 1435 to take any of the actions described herein. In some cases, one or more thresholds for the discrepancy between the detected breaches can the sales data can be applied, where the action depends whether the one or more thresholds are met. For example, in some cases a shopper may pick an item out of a shelf and then return it without purchasing the item. In this example, the system would detect more breaches than items purchased in the sales data. In some cases, a threshold number of breaches is applied, where the system will not count breaches below a threshold (e.g., 2 breaches or fewer within 30 seconds) towards the comparison with sales data. In some cases, the system does not trigger an alarm or notification if the sales data and the detected breaches are within a threshold amount of each other (e.g., discrepancy of 6 or less, so that the system would not trigger an alarm or notification if there are 12 breaches and only 6 items purchased). In some cases, different actions can be taken depending on how much disparity there is between the detected number of breaches and the sales data for the corresponding item. For example, below a first threshold, not action is taken, between the first threshold and a second threshold an email is sent to a manager at the end of the day, above the second threshold an automated call is made to a manager's phone number, etc. The system can have access to a database with sales data, such as received from cash registers, or other point of sale devices, such as in a retail store.

In addition to any of the outputs described herein that may occur in response to detection of a crime event, the system 1400 can produce other outputs in response to detection of a crime event. For example, in response to detection of a crime event, the system 1400 (e.g., the alarm trigger system 1435) can power a motor that causes a door to close (e.g., to prevent a perpetrator from leaving the premises), can trigger a mechanical component (e.g., bolt, latch, etc.) via an electrical signal that causes a door to lock (e.g., to prevent a perpetrator from leaving the premises), can sound an audible alarm or message or trigger a silent alarm, can trigger a visual display (e.g., cause a display 1450 displaying advertisement to instead display a warning message or other message to deter criminal activity), can transmit an email (e.g., to an email server accessible by a user device 1402) that includes information identifying why a theft event was detected, where the theft event was detected, and/or any other information describing the theft event (e.g., images, video, etc.), can transmit a text message that includes information identifying why a theft event was detected, where the theft event was detected, and/or any other information describing the theft event (e.g., images, video, etc.), can notify authorities of a potential theft event (e.g., via a phone call, electronic message, etc.), can active sprinklers of an indoor and/or outdoor sprinkler system located at or near the location at which the crime event is detect, can transmit live and/or previously-captured images, video, and/or audio of the theft event and/or the location where the crime event was detected (e.g., to the terminal 1465), cause a display or video wall (e.g., a set of displays placed side-by-side, such as in a 1×2 configuration, a 2×1 configuration, a 2×2 configuration, a 3×2 configuration, a 3×3 configuration, a 4×4 configuration, etc.) to prioritize the display of an image or video feed originating from the camera 1440 used to detect the crime event over other images or video feeds captured by other cameras 1440 that did not produce images or video used to detect the crime event. For example, a system can include more cameras than displays (e.g., for monitoring a border, a perimeter, a number of shelves, etc.), and the system can determine which cameras to use for the displays based at least in part on the potential crime event determinations discussed herein. In some systems, the intrusions within a timeframe analytic can be applied outside of the crime detection context, such as for inventory management (as discussed herein), and for safety systems. In an industrial setting, for example, detecting a threshold number of breaches into a monitored area within a timeframe can indicate a safety risk event, and the system can take appropriate action, such as to trigger an alarm, cause a ventilation system to evacuate gas from an area where the event is detected (e.g., in situations in which accessing a particular item or area one or more times can create a toxic or hazardous environment and the area needs to be aired out), cause a ventilation system to prevent gas from an area where the theft event is detected to reach other nearby areas (e.g., in situations in which accessing a particular item or area one or more times can create a toxic or hazardous environment and it is desired to shield other nearby areas from being exposed to the toxic or hazardous environment), and/or the like.

Alarm Detection Setup

Figure 15A:
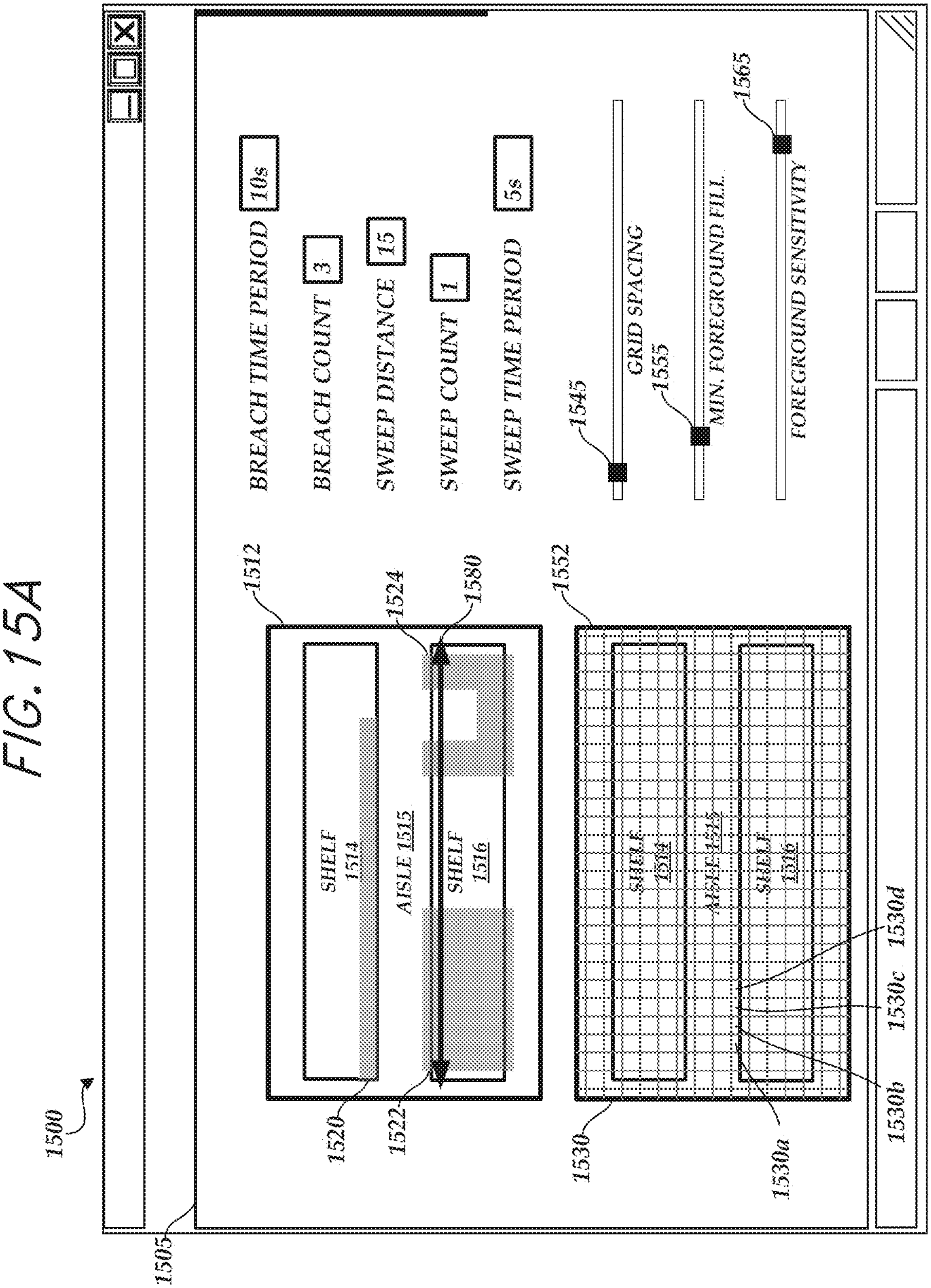
FIGS. 15A-15B illustrate a user interface for configuring the theft event detection functionality of the alarm controller.
Figure 15B:
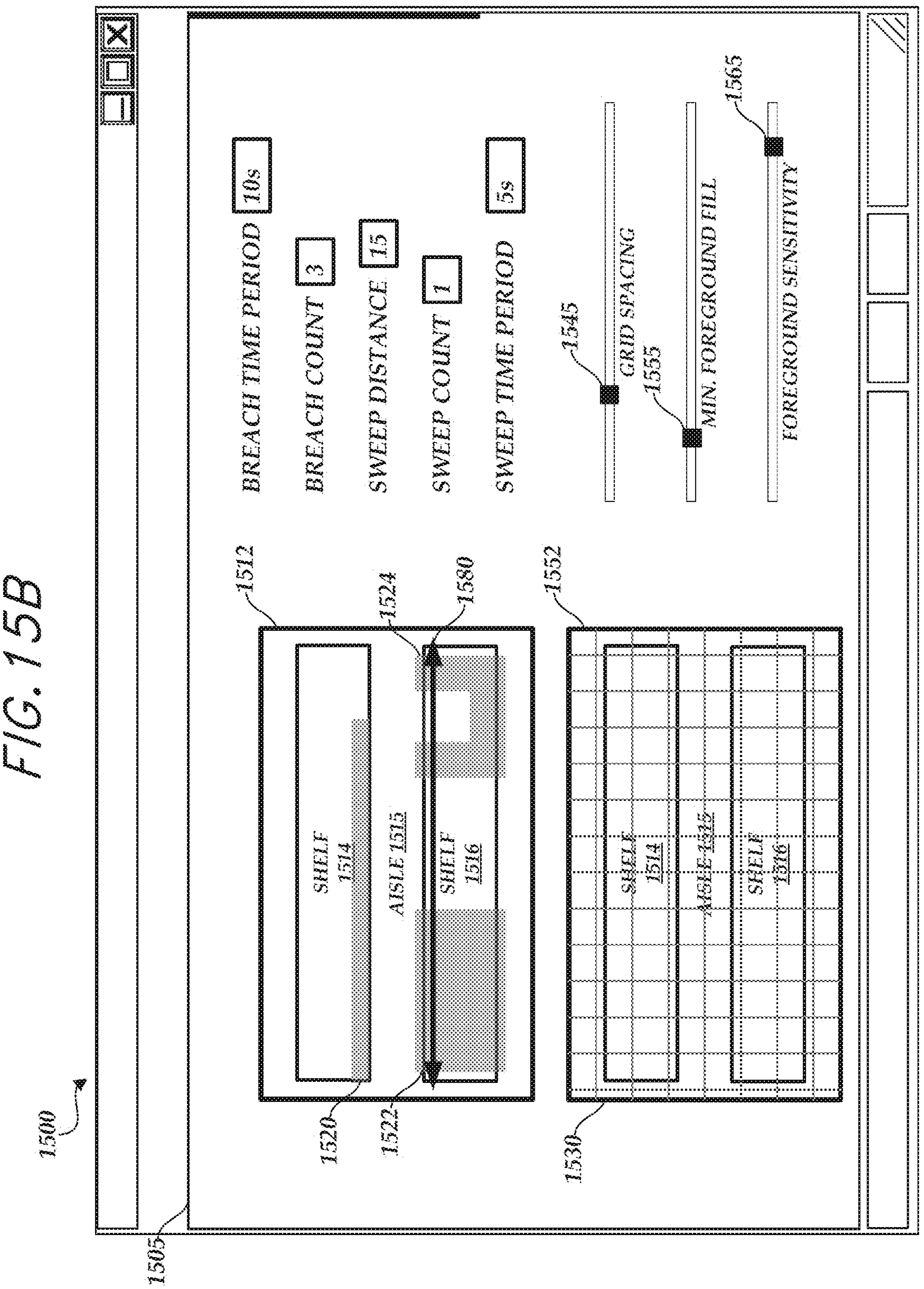

FIGS. 15A-15B illustrate a user interface 1500 for configuring the theft event detection functionality of the alarm controller 1430. The user interface 1500 can be generated in response to information provided by the alarm controller 1430 to allow a user (e.g., using a user device 1402, a physical computing device comprised within the dispatch system 1415, or another computing device located within the building) to configure or calibrate the alarm detection capabilities of the system 1400. For example, the alarm controller 1430 can generate user interface data that, when executed by a computing device (e.g., using a user device 1402, a physical computing device comprised within the dispatch system 1415, or another computing device located within the building) operated by a user, causes the computing device to generate the user interface 1500.

As illustrated in FIG. 15A, the user interface 1500 includes a window 1505. The window 1505 depicts an image 1512 of a portion of a store and a second image 1552 of the same portion of the store. The images 1512 and 1552 may be captured by a camera 1440 associated with a particular area or zone of a building. For example, the images 1512 and 1552 can depict a shelf 1514, a shelf 1516, and an aisle 1515 between the shelves 1514 and 1516 in the zone or area.

A user can use the image 1512 to identify portions of the zone that should be monitored for potential theft events. For example, the user interface 1500 provides a mask tool that allows a user to overlay one or more masks 1520, 1522, and 1524 onto the image 1512 to mark areas in the zone that are to be monitored. The masks 1520, 1522, and 1524 can be any shape and can be formed via a mask add tool that places a pre-formed mask onto the image 1512, an erase tool that allows a user to remove portions of the pre-formed mask, and a pencil tool that allows a user to add portions to the pre-formed mask. As an illustrative example, a user may place masks over locations at which high-value items are shelved.

The masks 1520, 1522, and 1524 may be virtual tripwire or fence masks, where a theft event is detected if a person in the depicted zone breaches (e.g., with an arm, foot, head, etc.) any portion of the shelf 1514, shelf 1516, and/or aisle 1515 covered by one of the masks 1520, 1522, or 1524 a threshold number of times within a certain time period. The user interface 1500 further includes fields to set the threshold number of times (e.g., referred to as the "breach count") and the time period (e.g., referred to as the "breach time period"). A breach can be detected when an object (e.g., a hand, arm, leg, or head) crosses a threshold, even if the object later retracts back across the threshold. This can be different from a counting function that would count a number of objects that pass completely through the threshold.

A theft event may also be detected if a person in the depicted zone performs a sweep action within any portion of the shelf 1514, shelf 1516, and/or aisle 1515 covered by one of the masks 1520, 1522, or 1524 once or a threshold number of times within a certain time period. For example, a sweep action may occur if a person reaches into a shelf at a first location, grabs one or more items between the first location and a second location, and pulls those item(s) from the shelf at the second location. The alarm controller 1430 may not receive video frames that indicate whether a person has grabbed any items in a shelf, but the alarm controller 1430 may identify a sweep action if activity is detected at the first location, at the second location, and/or at locations between the first and second locations. The user interface 1500 includes fields to set the sweep distance (e.g., a distance between a point at which a person reaches into a shelf and a point at which a person ceases reaching into the shelf that would constitute a "sweep" action or a distance between a point at which a person reaches into a shelf and a point at which a person is still reaching into the shelf after moving laterally along the shelf, which can indicate a "sweep" action is still occurring), the sweep direction (e.g., represented by line 1580, which can be drawn by a user over image 1512, and/or a user-provided numerical angle value that indicates a direction that a sweep would have to occur, where the alarm controller 1430 may detect a sweep if the detected activity indicates a sweep within a threshold angle of the sweep direction (e.g., represented by line 1580), where the threshold angle can also be user-defined or modified), the sweep count (e.g., a number of sweep actions or events that would have to occur within a certain time period to trigger a potential theft event), and the sweep time period (e.g., the time period in which the number of sweep actions would have to occur to trigger the potential theft event). As an example, the alarm controller 1430 may detect a sweep event if the sweep direction indicated by the user is at a 10° angle, the threshold angle is 5°, and the detected sweep direction is 12.5°. As an illustrative example, the alarm controller 1430 determines the sweep direction by identifying a first location at which a person reaches into a shelf (e.g., based at least in part on comparing a pair of image frames and identifying a difference in groups of pixels at the first location), a second location at which the person ceases reaching into the shelf or is still reaching into the shelf (e.g., based at least in part on comparing another pair of image frames and identifying a difference in groups of pixels at the second location) and the second location is within the threshold distance from the first location, and determining an angle or a slope of a line from the first location to the second location, where the angle can be calculated using a line with a slope of 0 (e.g., a horizontal line) as a point of reference. In further embodiments, the user interface 1500 allows a user to specify a curvature in the sweep direction (e.g., the line 1580 could be an arc) such that the alarm controller 1430 can detect sweep events even if a shelve curves or otherwise does not have a straight edge facing an aisle.

In some embodiments, the alarm controller 1430 detects a theft event if at least one of a breach event or a sweep event is detected. Alternatively, the alarm controller 1430 detects a theft event if both a breach event and a sweep event are detected.

A user can use the image 1552 to set parameters that define at what granularity the alarm controller 1430 detects activity (e.g., a breach or sweep) that may constitute a theft event. For example, a grid 1530 overlays the image 1552. The alarm controller 1430 detects activity if a threshold number or percentage of pixels in one or more boxes of the grid 1530 that are co-located with at least one of the masks 1520, 1522, or 1524 each change by at least a threshold value (e.g., by a threshold number of color values, by a threshold number of brightness values, by a threshold number of saturation values, and/or by a threshold number of hue values, by a threshold percentage, etc.). In other words, the alarm controller 1430 detects activity only in boxes of the grid 1530 that overlay a portion of the image 1552 that depicts the same area as a portion of the image 1512 overlaid by at least one of the masks 1520, 1522, and/or 1524. The alarm controller 1430, therefore, may ignore any activity that would otherwise be detected in boxes of the grid 1530 that overlay a portion of the image 1552 that depicts a different area than the portion of the image 1512 overlaid by at least one of the masks 1520, 1522, and/or 1524.

In some embodiments, the alarm controller 1430 can detect activity if a person in the depicted zone breaches (e.g., with an arm, foot, head, etc.) any portion of the shelf 1514, shelf 1516, and/or aisle 1515 covered by any one of the masks 1520, 1522, or 1524 a threshold number of times within a certain time period or if a person in the depicted zone performs a sweep action within any portion of the shelf 1514, shelf 1516, and/or aisle 1515 covered by any one of the masks 1520, 1522, or 1524 once or a threshold number of times within a certain time period. In other embodiments, the alarm controller 1430 detects activity if the activity occurs within the shelf 1514, shelf 1516, and/or aisle 1515 covered by one mask 1520, 1522, or 1524. For example, the alarm controller 1430 can detect activity if a person in the depicted zone breaches (e.g., with an arm, foot, head, etc.) any portion of the shelf 1514, shelf 1516, and/or aisle 1515 covered by one mask 1520, 1522, or 1524 a threshold number of times within a certain time period or if a person in the depicted zone performs a sweep action within any portion of the shelf 1514, shelf 1516, and/or aisle 1515 covered one mask 1520, 1522, or 1524 once or a threshold number of times within a certain time period. Thus, the alarm controller 1430 may not detect a breach event if, for example, the breach count is 4 and 2 breaches occur in a portion of the shelf 1514, shelf 1516, and/or aisle 1515 covered by mask 1520 and 2 breaches occur in a portion of the shelf 1514, shelf 1516, and/or aisle 1515 covered by mask 1522. In this embodiment, a user may create different masks for different shelves, different sides of a shelf, different aisles, etc. such that shelves, aisles, etc. can be individually monitored.

In other embodiments, the alarm controller 1430 detects activity if the activity occurs within the shelf 1514, shelf 1516, and/or aisle 1515 covered by any one of the masks 1520, 1522, or 1524 as long as the activity is performed by the same person. For example, the alarm controller 1430 can use video analysis to identify and/or track one or more persons. The alarm controller 1430 can identify a person moving in the aisle such as by changes in groups of pixels between image frames of the video footage (e.g., which can be compared to a user-specified person size). A person can be identified and can be tracked based on changes in successive groups of pixels in the image frames. In some cases, facial recognition can be used (e.g., by creating face information from previous frames and/or retrieving face information from the facial recognition data store 1432) to identify individual persons. The alarm controller 1430 can then track the activity of individual persons to identify breach or sweep events performed by the person, regardless of whether the breach or sweep events occur in the same shelf, aisle, etc. or different shelves, aisles, etc. Thus, the alarm controller 1430 can track individual persons and identify a potential theft event regardless of the location of the different breach or sweep events. In this embodiment, the alarm controller 1430 may then detect a breach potential theft event if the breach count is 3, the breach time period is 30 seconds, a first breach by a first person is detected in a first location of a store (e.g., a first shelf in a first aisle), a second breach by the first person is detected in a second location of the store (e.g., a second shelf in the first aisle), a third breach by the first person is detected in a third location of the store (e.g., a third shelf in the first aisle), and the first, second, and third breaches occur within 30 seconds of each other. In some cases, the breaches are grouped together if associated with the same detected person. Thus, if two separate people are reaching into opposing shelves in the same aisle, those breaches would not be grouped. But if a single person reaches into a shelf on one side and then quickly reaches into an opposing shelf on the other side of the aisle, then those breaches would be grouped.

The height and/or width of the boxes in the grid 1530 (e.g., in pixels) may then determine how sensitive the processing performed by the alarm controller 1430 is in determining whether activity occurred. For example, the smaller the grid 1530 box, the fewer pixels that may need to change in order for the alarm controller 1430 to detect activity. Likewise, the larger the grid 1530 box, the more pixels that may need to change in order for the alarm controller 1430 to detect activity. The user interface 1500 includes a slider 1545 that allows a user to adjust the grid size (e.g., where the height and/or width of a grid 1530 box becomes smaller if the slider 1545 is moved to the left and becomes larger if the slider 1545 is moved to the right) (e.g., referred to as "grid spacing"). Movement of the slider 1545 causes a corresponding change to the grid 1530 overlaying the image 1552. As an illustrative example, the slider 1545 is moved from the initial position depicted in FIG. 15A to the right, as illustrated in FIG. 15B. In response, the height and width of the boxes in the grid 1530 overlaying the image 1552 have become larger.

The user interface 1500 further includes a slider 1555 that allows a user to adjust by how much each pixel should change in order for the alarm controller 1430 to detect activity (e.g., referred to as "minimum foreground fill"). For example, moving the slider 1555 to the left may reduce the amount or percent by which a pixel needs to change and moving the slider 1555 to the right may increase the amount or percent by which a pixel needs to change. The user interface 1500 can also include a slider 1565 that allows a user to adjust the number or percentage of pixels in a grid 1530 box that should change in order for the alarm controller 1430 to detect activity (e.g., referred to as "foreground sensitivity"). For example, moving the slider 1565 to the left may reduce the number or percent of pixels that need to change and moving the slider 1565 to the right may increase the number or percent of pixels that need to change.

The user interface 1500 can further include other adjustable parameters, not shown. For example, the user interface 1500 can allow a user to adjust the frame rate at which the alarm controller 1430 processes video frames, the resolution at which video is recorded by the camera 1440, and/or the resolution used by the alarm controller 1430 to analyze video frames.

A user can set parameters for some or all of the cameras 1440 located in the system 1400, where the user interface 1500 is updated to depict an image captured by the camera 1440, view, or zone or area selected by the user to calibrate. Thus, each zone or area of a building can be calibrated differently based on the types of items located in a particular zone or area, the volume or types of people that frequent a particular zone or area, the visibility (or lack of visibility) provided by the camera 1440 located in a particular zone or area, etc.

Figure 16A:
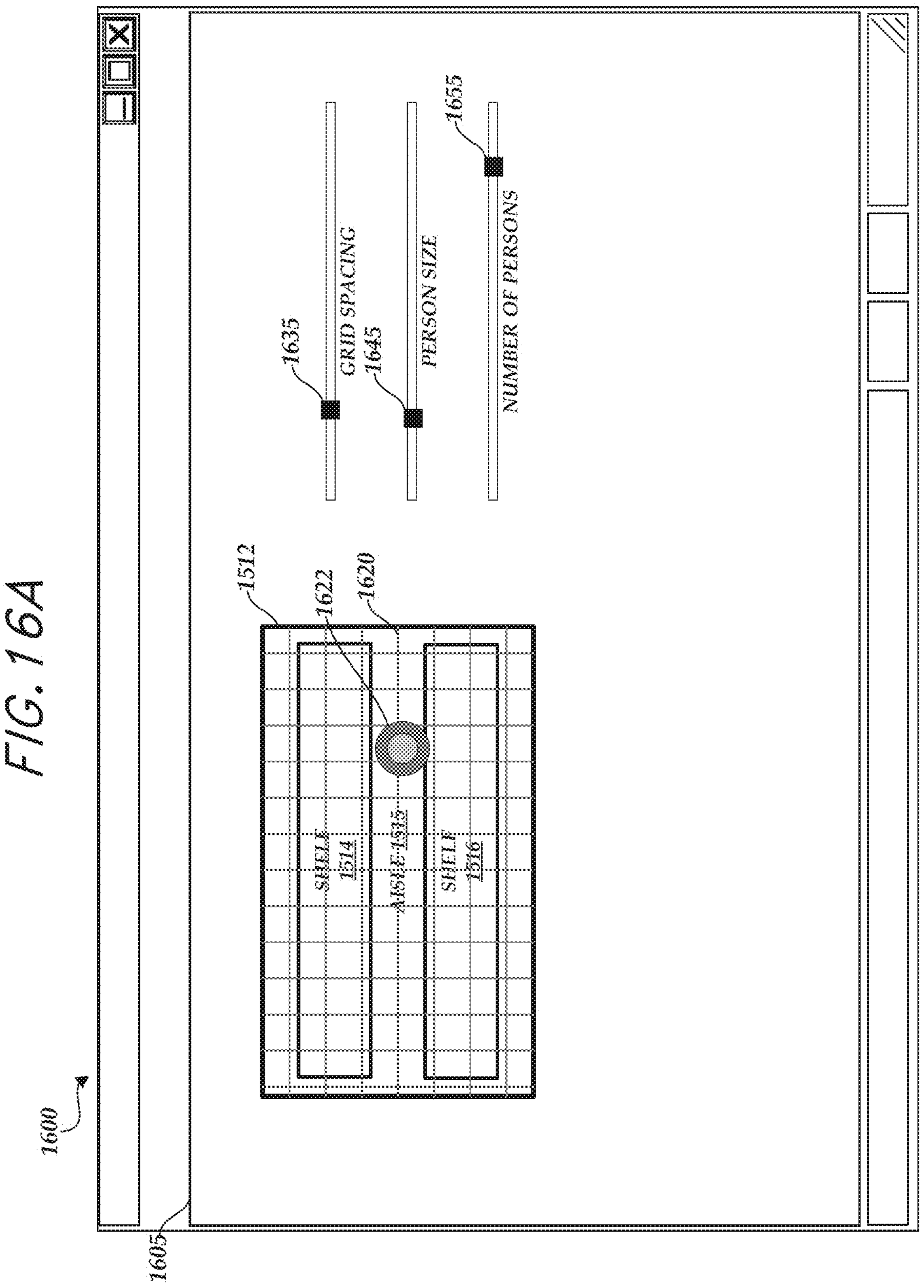
FIGS. 16A-16B illustrate another user interface for configuring the theft event detection functionality of the alarm controller.
Figure 16B:
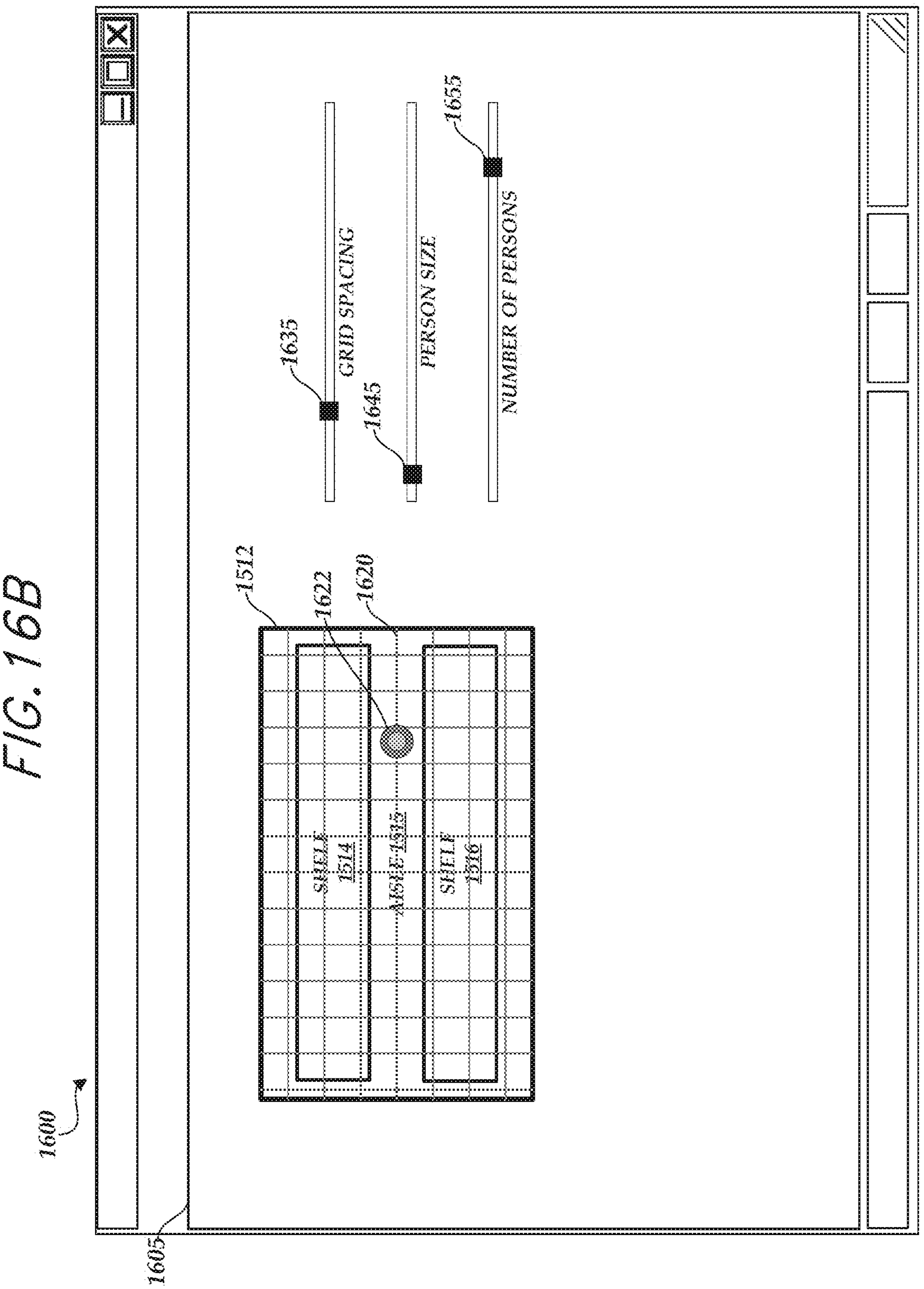

FIGS. 16A-16B illustrate another user interface 1600 for configuring the theft event detection functionality of the alarm controller 1430. The user interface 1600 can be generated in response to information provided by the alarm controller 1430 to allow a user (e.g., using a user device 1402, a physical computing device comprised within the dispatch system 1415, or another computing device located within the building) to configure or calibrate the alarm detection capabilities of the system 1400. For example, the alarm controller 1430 can generate user interface data that, when executed by a computing device (e.g., using a user device 1402, a physical computing device comprised within the dispatch system 1415, or another computing device located within the building) operated by a user, causes the computing device to generate the user interface 1600.

As illustrated in FIG. 16A, the user interface 1600 includes a window 1605. The window 1605 depicts the image 1512. A user can use the image 1512 to provide an average size of a person that can be used by the alarm controller 1430 to identify persons in the depicted zone and/or for crowd detection purposes. For example, the user interface 1600 overlays a grid 1620 and/or a shape 1622 over the image 1512. Like the grid 1530, the grid 1620 includes boxes that define how sensitive the alarm controller 1430 should be in detecting whether a person that is present in the depicted zone or area is moving. For example, the smaller a box, the fewer pixels that need to change for the alarm controller 1430 to detect that a person is moving. Likewise, the larger a box, the more pixels that need to change for the alarm controller 1430 to detect that a person is moving. Movement of a person may be used by the alarm controller 1430 to determine whether a person is loitering, as described in greater detail below. Slider 1635 allows a user to adjust the grid size (e.g., where the height and/or width of a grid 1620 box becomes smaller if the slider 1635 is moved to the left and becomes larger if the slider 1635 is moved to the right) (e.g., referred to as "grid spacing"). The user interface 1600, not shown, may further include sliders that allow a user to adjust by how much each pixel should change in order for the alarm controller 1430 to detect movement and/or that allow a user to adjust the number or percentage of pixels in a grid 1620 box that should change in order for the alarm controller 1430 to detect movement.

The shape 1622 represents an average size of a person. The alarm controller 1430 can use the selected average person size to detect persons in video captured by the camera 1440 as opposed to other objects (e.g., carts, animals, items, buckets, etc.). The user interface 1600 includes slider 1645 for adjusting the average size of a person (e.g., referred to as "person size"). For example, moving the slider 1645 to the left reduces the average size of a person and moving the slider 1645 to the right increases the average size of a person. Movement of the slider 1645 causes a corresponding change to the shape 1622 overlaying the image 1512. As an illustrative example, the slider 1645 is moved from the initial position depicted in FIG. 16A to the left, as illustrated in FIG. 16B. In response, the shape 1622 overlaying the image 1512 becomes smaller. The user interface 1600 may provide the user with the ability to adjust the average size of a person because video captured by the cameras 1440 may vary given that different cameras 1440 may capture video from different angles, elevations, etc.

The user interface 1600 may further include slider 1655, which allows a user to adjust the number of persons that may fit within the zone or area depicted by the image 1512 (e.g., the capacity of the depicted zone or area) (e.g., referred to as "number of persons"). Movement of the slider 1655 to the left may reduce the indicated number of persons that may fit within the zone or area and movement of the slider 1655 to the right may increase the indicated number of persons that may fit within the zone or area. The alarm controller 1430 can use this information for crowd detection purposes, and specifically for differentiating between two persons that may be located close to each other. The alarm controller 1430 can then reduce false positives by, for example, not counting one breach by a first person and another breach by a second person as two breaches by the same person (which could trigger the detection of a theft event if the breach count is 2). The user interface 1600 can further include other adjustable parameters, not shown.

A user can set these person parameters for some or all of the cameras 1440 located in the system 1400, where the user interface 1600 is updated to depict an image captured by the camera 1440, view, or zone or area selected by the user to calibrate. Thus, each zone or area of a building can be calibrated differently based on the angle, height, etc. of the camera 1440 associated therewith, the volume or types of people that frequent a particular zone or area, the visibility (or lack of visibility) provided by the camera 1440 located in a particular zone or area, etc.

Figure 17:
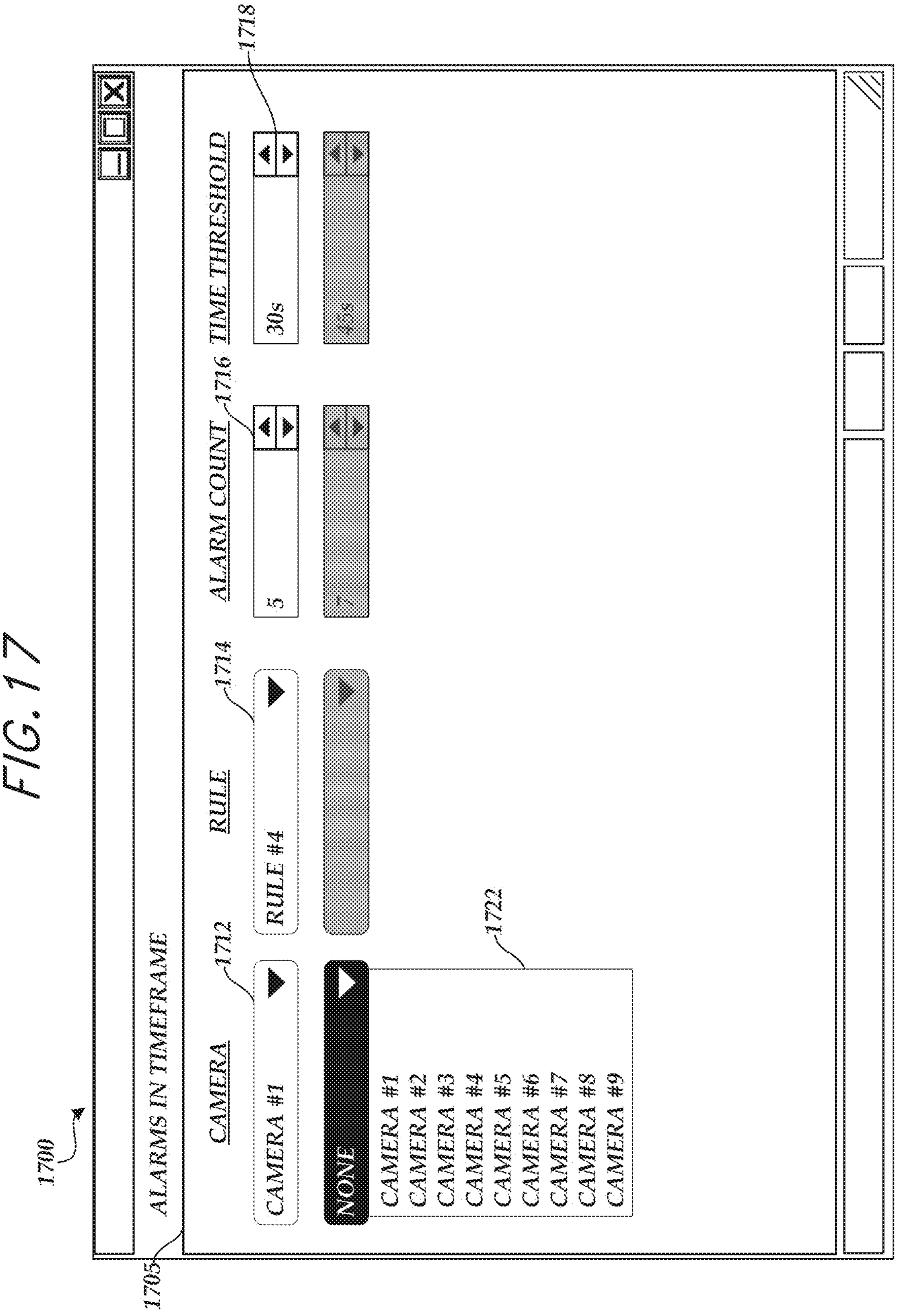
FIG. 17 illustrates another user interface for configuring the theft event detection functionality of the alarm controller.

FIG. 17 illustrates another user interface 1700 for configuring the theft event detection functionality of the alarm controller 1430. The user interface 1700 can be generated in response to information provided by the alarm controller 1430 to allow a user (e.g., using a user device 1402, a physical computing device comprised within the dispatch system 1415, or another computing device located within the building) to configure or calibrate the alarm detection capabilities of the system 1400. For example, the alarm controller 1430 can generate user interface data that, when executed by a computing device (e.g., using a user device 1402, a physical computing device comprised within the dispatch system 1415, or another computing device located within the building) operated by a user, causes the computing device to generate the user interface 1700.

The user interface 1700 can be used by a user to assign one or more rules to one or more cameras 1440, including alarm counts and/or time thresholds associated with such rule(s). For example, a rule can include an instruction to identify sweep actions, breach actions, and/or the like. As illustrated in FIG. 17, the user interface 1700 includes a window 1705, which can be a pop-up window, a window in a new tab, etc. The window 1705 includes one or more camera dropdown menu buttons 1712, one or more rule dropdown menu buttons 1714, one or more alarm count selectors 1716, and one or more time threshold selectors 1718.

A user can select a camera dropdown menu button 1712 to select a camera 1440 present in the system 1400. For example, selecting the camera dropdown menu button 1712 causes the user interface 1700 to display a list 1722 of available cameras 1440 in the system 1400.

Once a camera 1440 is selected, a user can select the rule dropdown menu button 1714 to select a rule to assign to the selected camera 1440. For example, FIG. 17 depicts that the user has assigned "Rule #4" (which could be a breach action rule, a sweep action rule, etc.) to "Camera #1."

Once the camera 1440 is selected, a user can also adjust the alarm count selector 1716 to adjust the alarm count associated with the camera 1440 and/or rule. For example, the alarm count may refer to a number of intrusions that would trigger an alarm. As an illustrative example, FIG. 17 depicts that the user has adjusted the alarm count to be 5 for Camera #1 and Rule #4. Thus, 5 breach actions, 5 sweep actions, etc. would have to occur to trigger an alarm.

Once the camera 1440 is selected, a user can also adjust the time threshold selector 1718 to adjust the time threshold associated with the camera 1440, rule, and/or alarm count. For example, the time threshold may refer to a time period within which the number of intrusions would have to occur to trigger an alarm. The time threshold can also be referred to as a "reset time" or "reset seconds." As an illustrative example, FIG. 17 depicts that the user has adjusted the time threshold to be 30 seconds for Camera #1 and Rule #4. Thus, 5 breach actions, 5 sweep actions, etc. would have to occur within 30 seconds to trigger an alarm.

Assigning a rule, an alarm count, and/or a time threshold to a camera 1440 may cause the alarm controller 1430 to process video captured by the camera 1440 to detect a potential theft event in a manner that is in accordance with the assigned rule, the selected alarm count, and/or the selected time threshold.

In addition to the settings described above with respect the user interfaces 1500, 1600, and 1700, the user interfaces 1500, 1600, and/or 1700 may depict other settings for configuring the alarm controller 1430. For example, another setting can include an angle of movement necessary for a breach or sweep event to be detected (where the angle setting can be applied similar to how an angle setting may be applied for a sweep event, as described above).

Video Analytics

As described herein, the alarm controller 1430 can process data received from one or more of the camera(s) 1440, the motion detector(s) 1455, and/or the seismic sensor(s) 1460 to detect a potential theft event. Once the various zones or areas are configured or calibrated using the user interfaces 1500, 1600, and/or 1700, the alarm controller 1430 can begin analyzing video footage captured by the camera(s) 1440. For example, as video is captured by a camera 1440, the camera 1440 can transmit the video to the alarm controller 1430 via the network switch 1425. Alternatively, the alarm controller 1430 can retrieve the video from the video data store 1468 via the network switch 1425.

The alarm controller 1430 can process one or more frames of the received video to detect a potential theft event. For example, the alarm controller 1430 can use the parameters set by the user via the user interface 1500 to determine which portion of the frames to process (e.g., the alarm controller 1430 processes the portion of the frames that corresponds to the location where a mask is placed). In some embodiments, the alarm controller 1430 can process portions of frames that correspond to locations where a mask is placed and can process portions of frames that correspond to locations where no mask is placed (e.g., no mask may be placed in aisles where person identification and/or tracking, facial recognition, crowd detection, etc. can be performed). The portion of the frames designated (e.g., by one or more masks) to process for detection of breach or sweep actions is sometimes referred to herein as the "monitored portion" or the "monitored area." The alarm controller 1430 can then compare a current video frame to one or more previous video frames to identify whether any pixels within the monitored portion have changed from the previous video frame(s) to the current video frame and, if so, the amount or percentage by which such pixels have changed. The grid 1530 set by the user and/or the other user-selected parameters may define how many pixels need to change and the extent by which the pixels have to change in order for the alarm controller 1430 to determine that activity is detected. In some cases, portions of the video footage outside of the "monitored portion" or "monitored area" can be analyzed, such as to identify and/or track a person in the aisle.

In further embodiments, the alarm controller 1430 processes the monitored portion to identify specific changes that could indicate a breach or a sweep action (e.g., an intrusion). For example, the alarm controller 1430 may detect a breach if the threshold number or percentage of pixels in a grid 1530 box within the monitored portion changed by the threshold amount or percentage between a previous video frame and a current video frame. The alarm controller 1430 may associate the detected breach with a time of the current video frame. The alarm controller 1430 may then process the video frame(s) to identify any person(s) present within the frame(s) (e.g., using the parameters selected in the user interface 1600). Once one or more persons are identified, the alarm controller 1430 can associate the detected breach and the time of the detected breach with an identified person (e.g., an identified person is associated with a detected breach if the location of the pixels representing the identified person are within a threshold distance or number of pixels as the pixels that changed to cause the breach detection). In some embodiments, the system can determine a breach based on information from the monitored area of the video frames (e.g., the shelves in the store) and also based on information outside the monitored area of the video frames (e.g., the aisle between the shelves). For example, when an object (e.g., a person's arm or hand) moves from outside the monitored area to inside the monitored area, a breach can be determined. In some cases, changes in pixels inside the monitored area do not trigger a breach unless there are changes in pixels at a corresponding area outside the monitored area. Thus, in some example implementations, if a product on the shelf falls over, it would not trigger a breach, if no person is in the aisle in front of the shelf. In some cases, changes in pixels inside the monitored area can trigger a breach regardless of what is happening outside the monitored area.

The alarm controller 1430 can then continue to process successive video frames in the same manner, detecting any further breaches. In some cases, the system can associate each breach with a person identified in the video footage, and only breaches associated with the same person are grouped together. Thus, an example threshold number of 4 breaches would not be reached if a first person reaches into a shelf 2 times, and a second person reaches into the shelf 2 times. In some cases, the system can group breaches if they are located within a threshold area or distance of each other. Thus, if one person reaches into the monitored area (e.g., a shelf) at a location that is more than the threshold distance away from another person who also reaches into the monitored area (e.g., the shelf), then those breaches would not be grouped together. Rather, each of those breaches can count as a first breach, and the system can count subsequent breaches made by each person separately. In some cases, the user can define the threshold area for grouping breaches, such as using a user interface like 1500 and/or 1600. For example a user can enter a value for "breach distance" in user interface 1500, which can define the size of the area for which multiple breaches will be grouped. A user interface can enable the user to visually define the size of the area, such as similar to the user adjustable shape 1622 of the user interface 1600. In some cases, the threshold area or distance can depend on the user-specified person size. Thus, if a person were defined to be of relatively smaller size in the video footage, then a smaller area of the video would be used for grouping breaches. If a person were defined to be of relatively larger size in the video footage, then a larger area of the video would be used for grouping breaches.

In some cases, a subsequent breach is only detected if the object (e.g., a person's hand or arm) is retracted out of the monitored area after the prior breach. Thus, in some cases, multiple breaches would not be identified if a person were to reach into a shelf and hold that position. For example, the person would need to retract their arm out of the shelf and then reinsert their arm into the shelf to register a second breach. In some cases, a breach can be determined each time an object enters the monitored area, regardless of what the object does before or after the breach.

If a threshold number of grouped breaches are detected within a threshold amount of time, the alarm controller 1430 can determine a potential theft event. If a threshold number of breaches (e.g., as set by the user in the user interfaces 1500 and/or 1700) are detected (e.g., associated with the same person or within the threshold area), the alarm controller 1430 can compare the times of the detected breaches to determine whether all of the detected breaches occurred within the user-set breach time period. If the detected breaches occurred within the user-set breach time period, then the alarm controller 1430 can determine a potential theft event, and can notify the alarm trigger system 1435 of the potential theft event, and take other actions as described herein. Otherwise, if the detected breaches did not all occur within the user-set breach time period, the alarm controller 1430 can discard any detected breaches that occurred before the current time minus the user-selected breach time period, and can repeat the process. In some cases, each breach can start a new time period that lasts for the defined period of time (e.g., set by the user) to watch for the additional breaches for triggering a potential theft event. Thus, if the setting requires 5 breaches within 30 seconds, a potential theft event would be triggered by a series of 7 breaches as follows (breach 1 at 0 seconds, breach 2 at 10 seconds, breach 3 at 30 seconds, breach 4 at 35 seconds, breach 5 at 40 seconds, breach 6 at 45 seconds, and breach 7 at 50 seconds).

As another example, the alarm controller 1430 may detect a sweep action if the threshold number or percentage of pixels within a series of one or more grid 1530 boxes within the monitored portion changed by the threshold amount or percentage between pairs of video frames, where the groups of pixels that changed span from one portion of the monitored portion to another portion of the monitored portion that is at least the sweep distance (e.g., which can be user defined) away from the one portion. In some cases, the determination of a sweep action can depend on the direction of the series of changes in pixel groups. For example, a sweep action can be determined if a direction (e.g., an angle or slope of a line or arc between the one portion and the other portion) is at least within a threshold angle of the sweep direction (which can be specified by the user). In particular, the alarm controller 1430 may detect the sweep action if (1) the threshold number or percentage of pixels within a first grid box (e.g., 1530*a* of FIG. 15A) at a first location of the monitored portion changed by the threshold amount or percentage between a first video frame and a second video frame; (2) the threshold number or percentage of pixels within one or more additional grid boxes (e.g., 1530*b* to 1530*d* of FIG. 15A) along a path between the first location and a second location of the monitored portion changed by the threshold amount or percentage between corresponding pairs of video frames; and (3) the distance between the first location of the monitored portion and the second location of the monitored portion is at least the user-selected sweep distance. In some embodiments, the system can determine a sweep action if (4) the direction between the first location of the monitored portion and the second location of the monitored portion is at least within a threshold angle of the sweep direction; and/or (5) the time between the video frames having the pixel changes that indicate the sweep from the first location to the second location (e.g., the difference between the timestamps of one video frame and a second video frame having the pixel changes that indicate the sweep from the first location to the second location) is less than or equal to a sweep time period, which can be user specified (e.g., via a user interface). In some embodiments, a sweep action can be determined independent of the direction of the sweep motion, and the sweep direction parameter can be omitted. In some cases a sweep action can be detected only if the object (e.g., a person's hand or arm) enters the monitored area at a first location, and then moves across the monitored area by the threshold amount to a second location without retracting from the monitored area. Thus, a sweep action would not be triggered if a user were to reach into the shelf a first location, then retract their arm, and then reach into the shelf at a second location that is beyond the threshold distance.

The alarm controller 1430 may process the video frame(s) to identify any persons present within the frame(s) (e.g., using the parameters selected in the user interface 1600). Once one or more persons are identified, the alarm controller 1430 can associate the detected action(s) (e.g., sweep action) and the time of the detected action (e.g., sweep action) with an identified person (e.g., an identified person is associated with a detected sweep action if the location of the pixels representing the identified person are within a threshold distance or number of pixels as the pixels that changed to cause the sweep action detection). In some cases a single sweep action can trigger a potential theft event. In some cases the settings can be set so that multiple sweep actions are detected (e.g., within a threshold amount of time, such as the sweep time period, which can be user specified) before a potential theft event is triggered. In some cases a combination of sweep and breach actions can trigger a potential theft event.

The alarm controller 1430 can continue to process successive video frames in the same manner, detecting any further actions (e.g., additional sweep actions). If a threshold number of actions (e.g., breach and/or sweep actions) (e.g., as set by the user in the user interfaces 1500 and/or 1700) associated with the same person is detected, the alarm controller 1430 can compare the times of the detected actions (e.g., breach and/or sweep actions) to determine whether the detected actions (e.g., breach and/or sweep actions) occurred within a user-set time period. If the detected sweep actions occurred within the user-set sweep time period, then the alarm controller 1430 notifies the alarm trigger system 1435 of a potential theft event, as described herein. Otherwise, if the detected actions (e.g., breach or sweep actions) did not all occur within the user-set sweep time period, the alarm controller 1430 can discard any detected actions (e.g., breach and/or sweep actions) that occurred before the current time minus the user-selected time period, and can repeat the process.

In some embodiments, an obstruction (e.g., an object, a shadow, etc.) may be present between the camera lens and the monitored portion of a store. Thus, a sweep action that occurred may not be detected by the alarm controller 1430 in some cases because the user performed the sweep action within the obstructed area and the alarm controller 1430 may determine that the user retracted his or her arm (given the obstruction) or otherwise determine that the user did not complete a full sweep motion (e.g., because no pixels changed in the area covered by the obstruction). Thus, the alarm controller 1430 may include a threshold gap distance value (that may or may not be set by a user), where the alarm controller 1430 may still detect a sweep action even if no pixels changed over a distance falling within the threshold gap distance value.

As described herein, the alarm controller 1430 can relax the user-set parameters under certain conditions. For example, the alarm controller 1430 can process the video frame(s) to identify one or more persons present in the depicted zone or area. If an identified person does not move for a threshold period of time (or a threshold number of video frames), the alarm controller 1430 can determine that the identified person is loitering. In response, the alarm controller 1430 can either immediately notify the alarm trigger system 1435 of a potential theft event or can reduce the requirements for detecting a potential theft event. Requirement reductions can include increasing the breach time period, reducing the breach count, reducing the sweep distance, reducing the sweep count, increasing the sweep time period, reducing the height and/or width of the grid 1530 boxes, reducing the minimum foreground fill, reducing the foreground sensitivity, and/or the like. The reduction in requirements can apply to any person present in the depicted zone or area, not just the detected loiterer. Thus, by identifying a loitering person, the alarm controller 1430 can relax the requirements for detecting a potential theft event given that a loitering individual increases the likelihood that a potential theft event is occurring or is about to occur.

As another example, the alarm controller 1430 can relax the user-set parameters if, for example, the alarm controller 1430 processes the video frame(s) and identifies a specific number of persons present in an aisle. For example, the alarm controller 1430 can relax the user-set parameters if two persons are present in the aisle. However, the alarm controller 1430 may not relax the user-set parameters if three persons, four persons, five persons, etc. are present in the aisle. In many instances, an organized retail crime (ORC) event involves two individuals working together, and it is less common for 3 or 4 or more people to work together to perpetrate an ORC. Also, it is not common for a thief to perform the theft while other shoppers are present. Thus, the number of people present at the monitored location can be used in the determination of whether to trigger the potential crime event.

The alarm controller 1430 can further use data from the motion detector(s) 1455 and/or the seismic sensor(s) 1460 to determine whether or not to notify the alarm trigger system 1435 that a potential theft event is detected. In some cases a motion sensor can be used together with a curtain lens to provide a threshold sensor that can determine when an object (e.g., a person's hand) crosses a threshold. The threshold sensor can be used to confirm breach actions that are identified using the video analytics (e.g., the video analysis performed by the alarm controller 1430). If the video analytics identify a breach action, but the threshold sensor does not detect a breach, an error can be identified. A message can be delivered to a user, which can indicate that remedial action may be needed. In some cases, a breach action that is identified by the video analytics or by the threshold sensor but that is not identified by the other of the threshold sensor or the video analytics can be ignored or discounted by the system, which can reduce false positives. Motion sensors can be used for other features as well. In some cases, the alarm controller 1430 may determine that a person is loitering based on processing the video frame(s). The alarm controller 1430 may further analyze data received from a motion detector 1455 located in or associated with the depicted zone or area to determine the motion detector 1455 detects any motion. If the motion detector 1455 detects motion in the vicinity of the identified loiterer, then the alarm controller 1430 may determine that detection of the loiterer is a false positive and therefore may not relax the user-set parameters. Thus, the motion detector 1455 data and the video frame processing data can be used by the alarm controller 1430 in conjunction to determine whether a potential theft event is detected.

Similarly, if the alarm controller 1430 receives data from a seismic sensor 1460 indicating that vibrations are detected in a depicted zone or area, the alarm controller 1430 may not notify the alarm trigger system 1435 that a potential theft event is occurring unless the alarm controller 1430 also identifies at least one person present in the depicted zone or area via the processing of the video frame(s). Thus, the seismic sensor 1460 data and the video frame processing data can be used by the alarm controller 1430 in conjunction to determine whether a potential theft event is detected.

In an embodiment, the techniques of the video analysis performed by the alarm controller 1430 as described herein can be integrated by a computing device that implements existing video management software. For example, existing video management software may generally analyze images and/or video for motion detection purposes. Such video management software may be improved by using the techniques performed by the alarm controller 1430 to detect not just motion, but also potential theft events. Various types of video analysis can be used, including masked areas, visual tripwire(s), etc. to identify breaches into a monitored area.

Restocking Mode

Periodically, a store employee may restock shelves. The actions performed by the store employee to restock the shelves may mirror breaches, sweeps, or other theft detection events. Thus, during this period, it may be desirable for the alarm controller 1430 to ignore such actions and/or to otherwise not detect a potential theft event to avoid false positives.

Accordingly, the alarm controller 1430 can be configured to enter a restocking mode for one or more monitored zones or areas to reduce the number of false positives. For example, the alarm controller 1430 can enter the restocking mode for a particular zone or area at a set time (e.g., a time that shelves in the zone or area are typically restocked, as set by a user) and/or for a set period of time, based on a user input (e.g., a user identifying a zone or area which should be monitored in the restocking mode) and/or for a set period of time, and/or the like. Thus, the alarm controller 1430 can have one zone or area in a restocking mode while continuing to monitor other zones or areas in a normal mode (e.g., using the techniques described herein).

In the restocking mode, in some embodiments, the alarm controller 1430 ceases processing video frames received from camera(s) 1440 in the zone or area until the zone or area is no longer in the restocking mode. In the restocking mode, in other embodiments, the alarm controller 1430 continues to process video frames received from camera(s) 1440 in the zone or area. However, the alarm controller 1430 may process the video frames to identify specific changes that could indicate a sweep action, but not specific changes that could indicate a breach action (e.g., because the act of restocking a shelf may be more likely to resemble a series of breach actions than a sweep action). Thus, the alarm controller 1430 may continue to process video frames in order to identify certain types of potential theft events, but not other types of potential theft events, while under the restocking mode.

Alternatively, the alarm controller 1430 may process the video frames to identify any type of potential theft event. However, the alarm controller 1430 may use facial recognition to differentiate between store employees and others (e.g., customers). For example, the facial recognition data store 1432 can store facial information of store employees (e.g., images of the faces of store employees). The alarm controller 1430 can use the facial information stored in the facial recognition data store 1432 to identify whether a person depicted in a video frame being processed is a store employee or another person (e.g., by comparing the pixels of the facial information stored in the facial recognition data store 1432 with pixels in the video frame being processed). If the identified person is determined to be a store employee, then the alarm controller 1430 may not identify a potential theft event if a change of pixels that would normally lead to an identification of a potential theft event are attributable to the store employee. If the identified person is determined not to be a store employee (e.g., there is no match between the pixels of the facial information stored in the facial recognition data store 1432 and the pixels in the video frame being processed), then the alarm controller 1430 processes the video frames to identify a potential theft event in a manner as described herein. In some cases, other types of video analysis can be used to identify a store employee, instead of facial recognition analysis. For example, video analysis can identify an employee based on clothing being worn, based on a badge or logo, etc.

Example Theft Event Detection Routine

Figure 18:
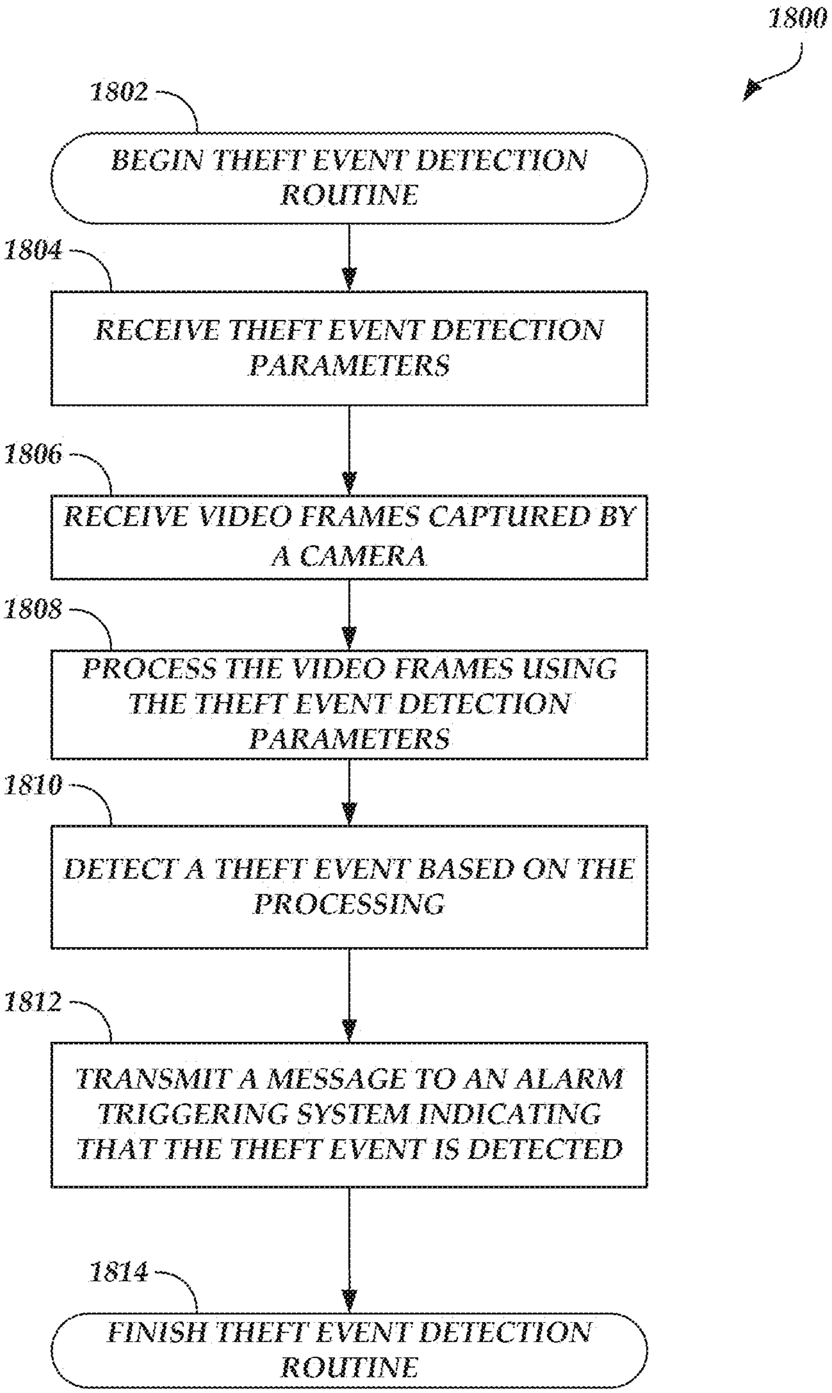
FIG. 18 is a flow diagram depicting a theft event detection routine illustratively implemented by an alarm controller.

FIG. 18 is a flow diagram depicting a theft event detection routine 1800 illustratively implemented by an alarm controller, according to one embodiment. As an example, the alarm controller 1430 of FIG. 14 can be configured to execute the theft event detection routine 1800. The theft event detection routine 1800 begins at block 1802.

At 1804, theft event detection parameters are received. The theft event detection parameters can include the user-set parameters depicted in and/or described with respect to the user interfaces 1500, 1600, and/or 1700.

At block 1806, video frames captured by a camera are received. The video frames may be received from a camera that is associated with a zone or area corresponding to the received theft event detection parameters. The method 1800 is discussed in the context of one camera, but it will be understood that the system can monitor information from multiple cameras (e.g., a multiple areas).

At block 1808, the video frames are processed using the theft event detection parameters. For example, the alarm controller 1430 processes the video frames to identify a threshold number or percentage of pixels in a monitored portion that have changed by a threshold amount or percentage.

At block 1810, a theft event is detected based on the processing. For example, the theft event may be detected based on detecting breach activity or sweep action(s).

At block 1812, a message is transmitted to an alarm triggering system indicating that the theft event is detected. In response, the alarm triggering system can cause the output of an audible message, trigger an alarm, cause a display 1450 to display information or store personnel, call a terminal 1465 and establish a communication link between the camera 1440 and the terminal 1465, cause a camera 1440 to call the terminal 1465 to initiate two-way communications, notify the dispatch system 1415, notify the user device 1402, etc. After the message is transmitted, the theft event detection routine 1800 ends, as shown at block 1814.

Example Use Cases

Figure 19:
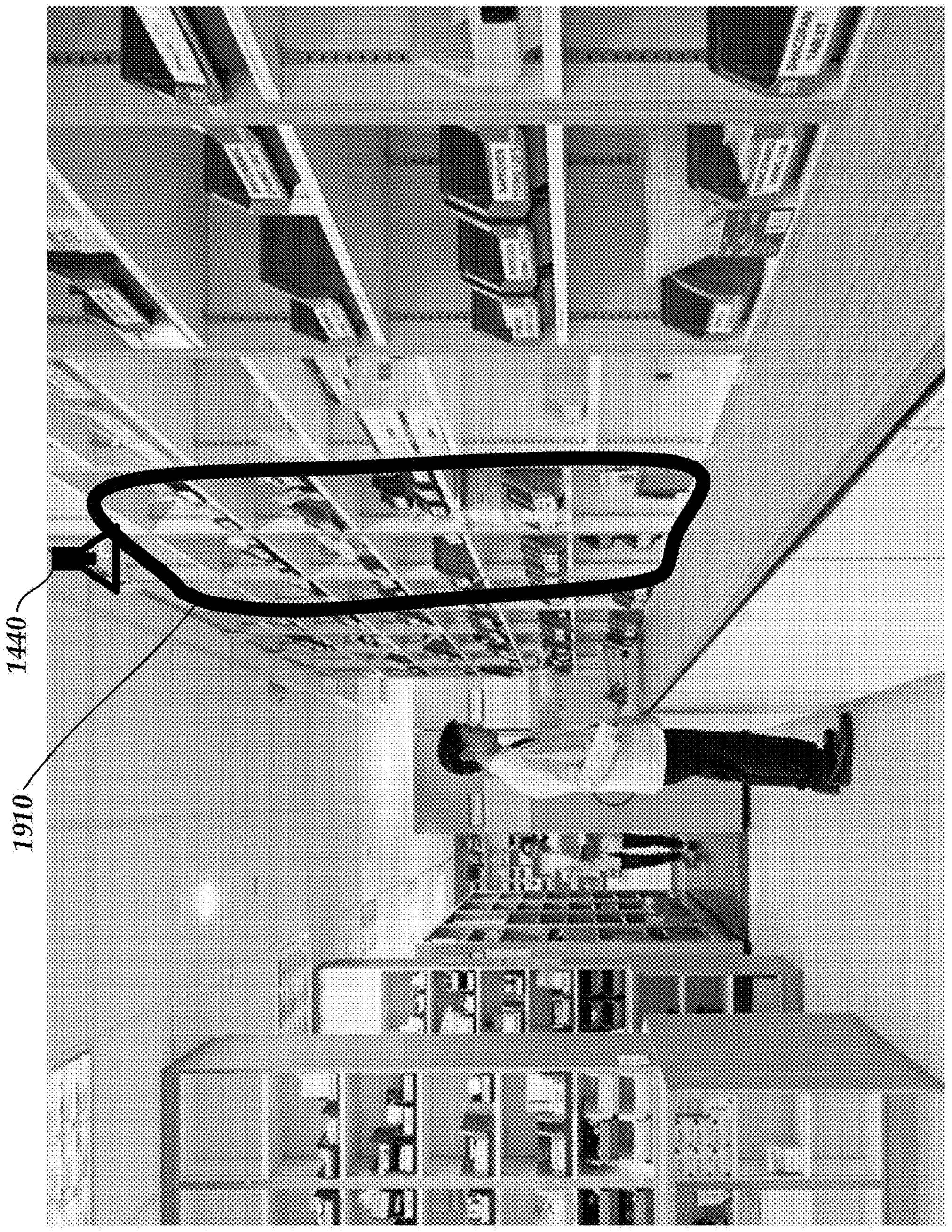
FIG. 19 illustrates an example pharmacy at which the system of FIG. 14 can manage inventory and/or detect potential crime.

FIG. 19 illustrates an example pharmacy at which the system 1400 can manage inventory and/or detect potential crime. For example, a camera 1440 of the system 1400 can be located near the ceiling of the pharmacy, pointing at an area 1910 such that the alarm controller 1430 can monitor the area 1910 in a manner as described herein. In particular, the camera 1440 may be positioned such that the alarm controller 1430 can detect the retrieval of items from shelves, counters, cabinets, racks, etc. in the area 1910. Such detection may be used for inventory management purposes and/or to detect potential criminal or otherwise unauthorized activity (e.g., detect whether an item is being stolen, detect whether a particular item is accessed more than allowed by the law, by the premise's rules or regulations, etc.).

While FIG. 19 illustrates an example pharmacy, this is not meant to be limiting. The system 1400 can be set up in a similar manner to monitor shelves, counters, cabinets, racks, etc. at a distribution center, a manufacturing plant, a retail store, a storage facility, and/or any other type of premise at which items are available for retrieval.

Figure 20:

FIG. 20 illustrates the exterior of an example commercial or industrial building 2000 at which the system 1400 can detect potential crime, such as tagging, graffiti, forcible entry, and/or the like. For example, a camera 1440 of the system 1400 can located on the exterior of the building 2000, pointing at an area 2010 exterior to the building 2000 such that the alarm controller 1430 can monitor the area 2010 in a manner as described herein. In particular, the camera 1440 may be positioned such that the alarm controller 1430 can detect tagging or the application of graffiti, a break-in (e.g., via the breaking of locks, the hacking of doors, etc.), or other illegal or unauthorized activity occurring in the area 2010. Other cameras 1440, not shown, may be positioned at other areas external to the building 2000 such that some or all of the exterior of the building 2000 can be monitored by the alarm controller 1430.

While FIG. 20 illustrates an example commercial or industrial building 2000, this is not meant to be limiting. The system 1400 can be set up in a similar manner to monitor the exterior of any structure, such as a residential home, a government building, a vehicle (e.g., a car, a train car, a boat, a plane, etc.), a standalone wall (e.g., a wall of a highway), a bridge, and/or the like.

Terminology

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors or controllers described herein can be coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. A universal media server (UMS) can be used in some instances. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed a controller in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

The following is claimed:

1. A system, comprising:
- a camera positioned to provide video footage of a region that includes a monitored area; and
- a controller comprising:
  - at least one hardware processor; and
  - computer-readable memory in communication with the at least one hardware processor, the memory containing a threshold breach count value, a threshold breach time value, and instructions executable by the at least one processor to cause the controller to:
    - receive the video footage of the region that includes the monitored area;
    - perform video analysis on the video footage to identify one or more persons in the region that includes the monitored area;
    - perform video analysis on the video footage to identify a first breach into the monitored area;

perform video analysis on the video footage to determine that the first breach into the monitored area was performed by a first identified person;

perform video analysis on the video footage to identify a second breach into the monitored area;

perform video analysis on the video footage to determine that the second breach into the monitored area was performed by the first identified person; and determine an event based at least in part on detecting a threshold number of breaches performed by the same first identified person, wherein the threshold number of breaches satisfies the threshold breach count value within a time that satisfies the threshold breach time value;

perform video analysis on the video footage to identify a third breach into the monitored area; and perform video analysis on the video footage to determine that the third breach into the monitored area was performed by a second identified person different from first identified person, wherein the controller does not count the third breach towards the threshold number of breaches.

2. The system of claim 1, wherein the monitored area comprises merchandise shelves in a retail store.

3. The system of claim 1, wherein the first breach is on a first merchandise shelf and the second breach is on a second merchandise shelf.

4. The system of claim 1, wherein the instructions are configured to cause the controller to provide a user interface configured to receive user input to change the threshold breach count value and the threshold breach time value.

5. The system of claim 1, wherein the instructions are configured to cause the controller to provide a user interface configured to receive user input to indicate a person size for the video footage.

6. The system of claim 1, wherein the instructions are configured to cause the controller to issue a notification in response to the determination of the event.

7. The system of claim 6, wherein the controller is configured to determine a number of people in a monitored location, and the controller can determine whether to issue the notification based at least in part on the determined number of people.

8. A method comprising:

receiving video footage of a region that includes a monitored area;

processing the video footage using at least one hardware processor to identify one or more persons in the region that includes the monitored area;

processing the video footage using the at least one hardware processor to identify a plurality of breaches into the monitored area;

processing the video footage using the at least one hardware processor to determine which of the one or more persons performed each of the plurality of identified breaches;

accessing a threshold breach count value, and a threshold breach time value stored in computer-readable memory in communication with the at least one hardware processor;

determining an event using the at least one hardware processor by at least identifying a threshold number of breaches performed by the same person that satisfies the threshold breach count value at times within the threshold breach time value;

processing the video footage to identify an additional breach into the monitored area; and processing the video footage to determine that the additional breach into the monitored area was performed by a second identified person different from first identified person, wherein the method does not count the additional breach towards the threshold number of breaches.

9. The method of claim 8, wherein the monitored area comprises merchandise shelves in a retail store.

10. The method of claim 8, wherein the first breach is on a first merchandise shelf and the second breach is on a second merchandise shelf.

11. A non-transitory computer-readable medium comprising:

a threshold breach count value;

a threshold breach time value; and instructions executable by at least one processor to:

receive video footage of a region that includes a monitored area;

perform video analysis on the video footage to identify one or more persons in the region that includes the monitored area;

perform video analysis on the video footage to identify a plurality of breaches into the monitored area;

perform video analysis on the video footage to determine which of the one or more persons performed each of the plurality of identified breaches;

identify an event at least in part by determining that a single person performed a threshold number of breaches that satisfies the threshold breach count value at times within the threshold breach time value;

perform video analysis on the video footage to identify an additional breach into the monitored area; and perform video analysis on the video footage to determine that the additional breach into the monitored area was performed by a second identified person different from first identified person, wherein the processor does not count the additional breach towards the threshold number of breaches.

12. The computer-readable medium of claim 11, wherein the monitored area comprises merchandise shelves in a retail store.

13. The computer-readable medium of claim 11, wherein the instructions are configured to provide a user interface configured to receive user input to change the threshold breach count value and the threshold breach time value.

14. The computer-readable medium of claim 11, wherein the instructions are configured to provide a user interface configured to receive user input to indicate a person size for the video footage.

15. The computer-readable medium of claim 11, wherein the instructions are configured to issue a notification in response to the determination of the event.

16. The computer-readable medium of claim 11, wherein the instruction are configured to cause the processor to determine a number of people in a monitored location, and the controller can determine whether to issue the notification based at least in part on the determined number of people.

* * * * *